(12) United States Patent
Adachi et al.

(10) Patent No.: US 6,850,963 B1
(45) Date of Patent: Feb. 1, 2005

(54) METHOD OF PROVIDING SUBSCRIPTION BASED INFORMATION SERVICES THROUGH AN INFORMATION SERVICE PROVIDER

(75) Inventors: Kazuhiro Adachi, Kawagoe (JP); Masahiro Akahori, Kawasaki (JP); Katsuhisa Fukuda, Kawasaki (JP); Takahiro Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 815 days.

(21) Appl. No.: 09/655,492

(22) Filed: Sep. 5, 2000

(30) Foreign Application Priority Data

Mar. 9, 2000 (JP) ........................................ 2000-065090

(51) Int. Cl.[7] .............................................. G06F 15/16
(52) U.S. Cl. ...................... 709/203; 709/217; 709/219; 705/52
(58) Field of Search ................................ 709/217–219, 709/203, 206; 707/1–4; 705/52

(56) References Cited

U.S. PATENT DOCUMENTS

| | | | | |
|---|---|---|---|---|
| 5,031,214 A | * | 7/1991 | Dziewit et al. ............. | 713/176 |
| 5,404,295 A | * | 4/1995 | Katz et al. .................... | 707/2 |
| 5,768,508 A | * | 6/1998 | Eikeland ..................... | 709/202 |
| 5,905,862 A | * | 5/1999 | Hoekstra ..................... | 709/202 |
| 5,974,409 A | * | 10/1999 | Sanu et al. ................... | 707/3 |
| 6,262,729 B1 | * | 7/2001 | Marcos et al. .............. | 345/744 |
| 6,272,492 B1 | * | 8/2001 | Kay ............................ | 707/10 |

FOREIGN PATENT DOCUMENTS

EP   WO 95/08231   *   3/1995   ............ H04K/1/00

OTHER PUBLICATIONS

Online Content: Fee or Free?, Wilder, C., InformationWeek n671, ISSN 8750–6874, Mar. 2, 1998, pp. 42–58.*

* cited by examiner

*Primary Examiner*—Beatriz Prieto
(74) *Attorney, Agent, or Firm*—Antonelli, Terry, Stout & Kraus, LLP

(57) ABSTRACT

An information service providing method for providing an information service is provided, wherein the method includes the steps of: receiving a customer's request for the information service to be provided with; deciding the customer's utilization qualification with respect to the contents of the information service; determining the contents that is available to the customer according to the customer's utilization qualification among the contents of the information service that the customer requests to be provided with; and providing the customer with the determined contents of the information service.

15 Claims, 19 Drawing Sheets

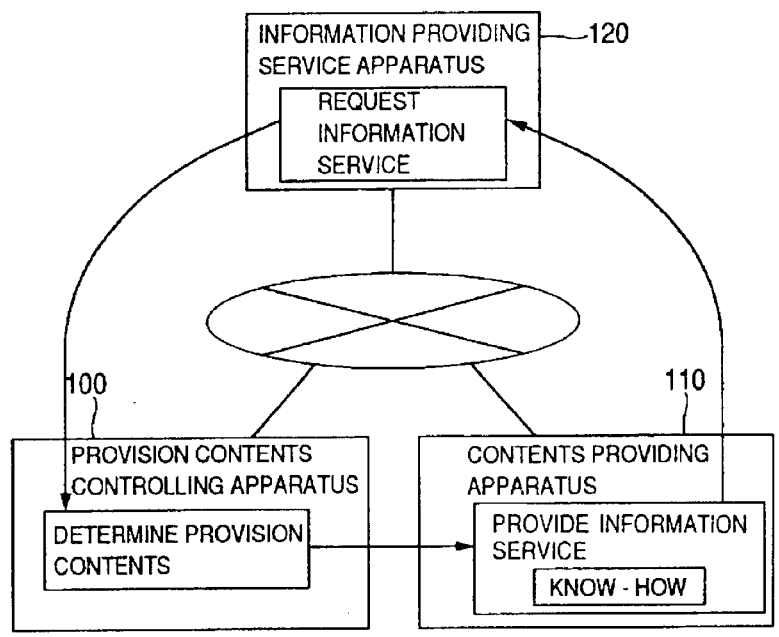
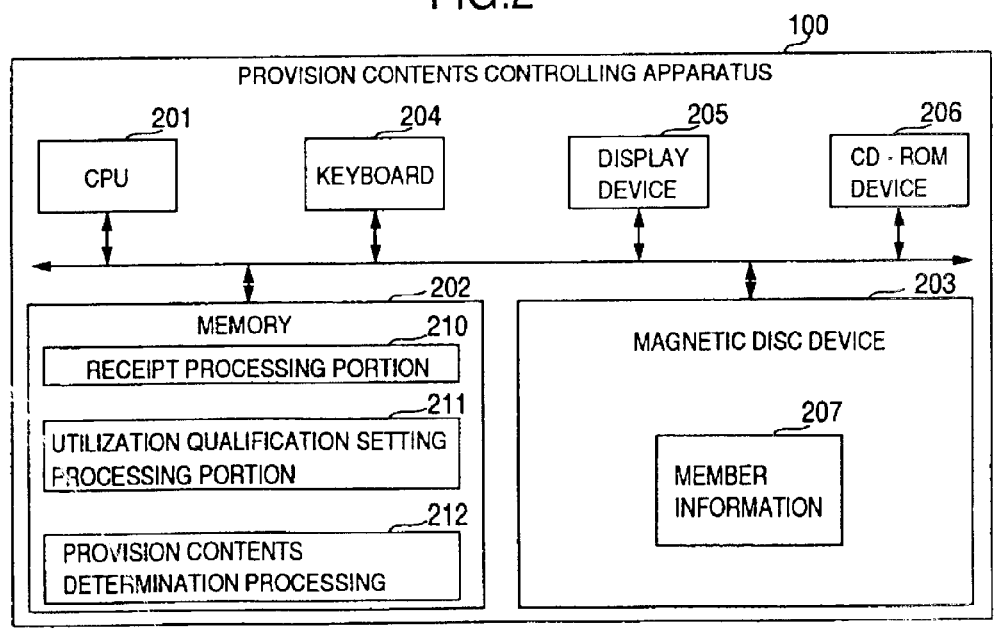

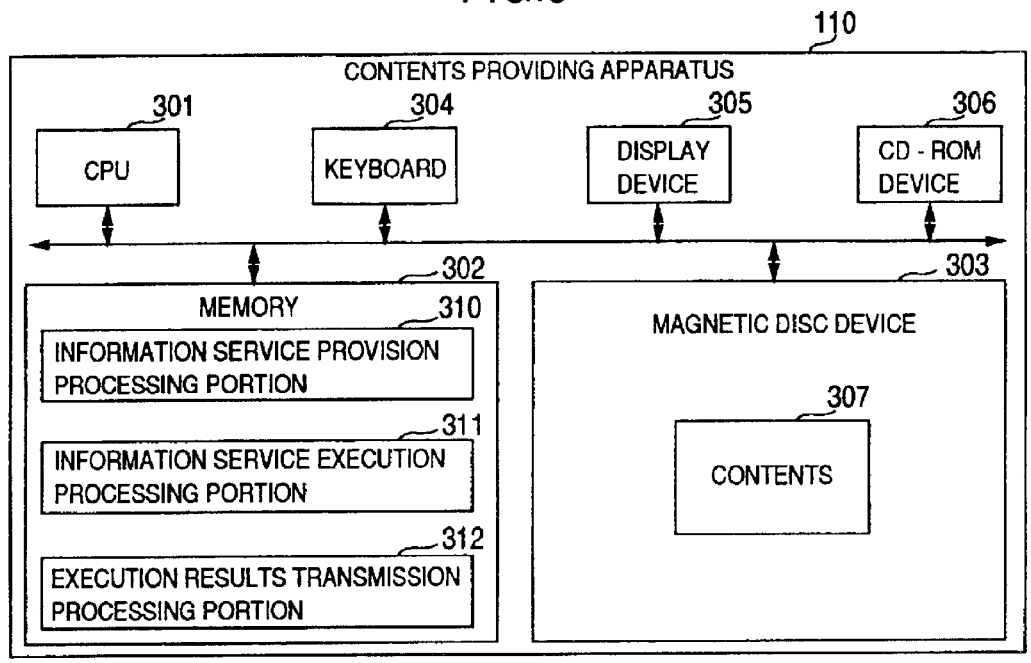
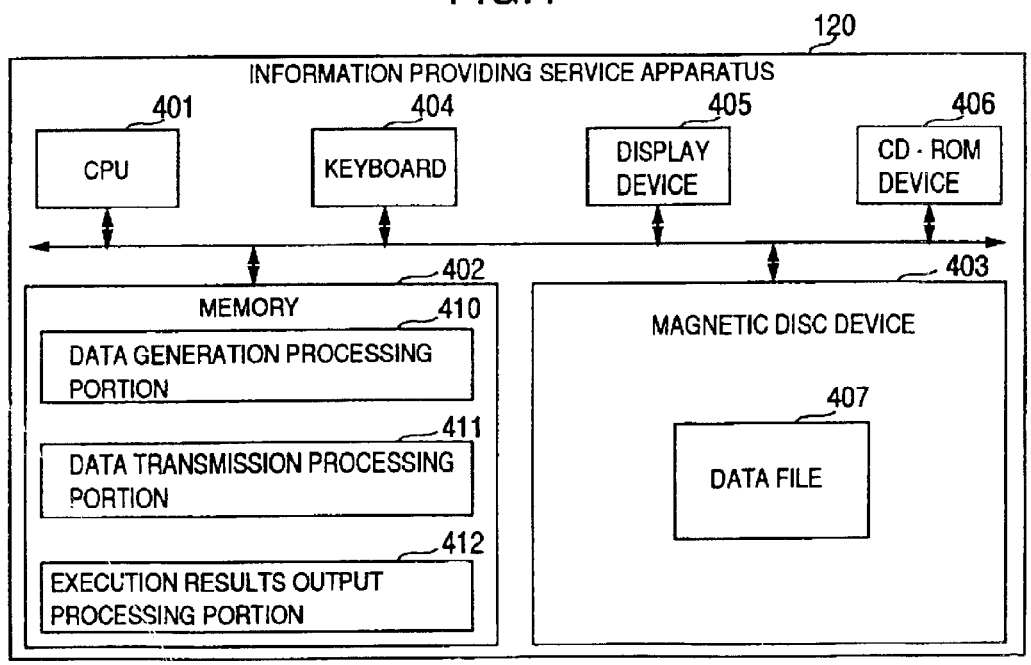

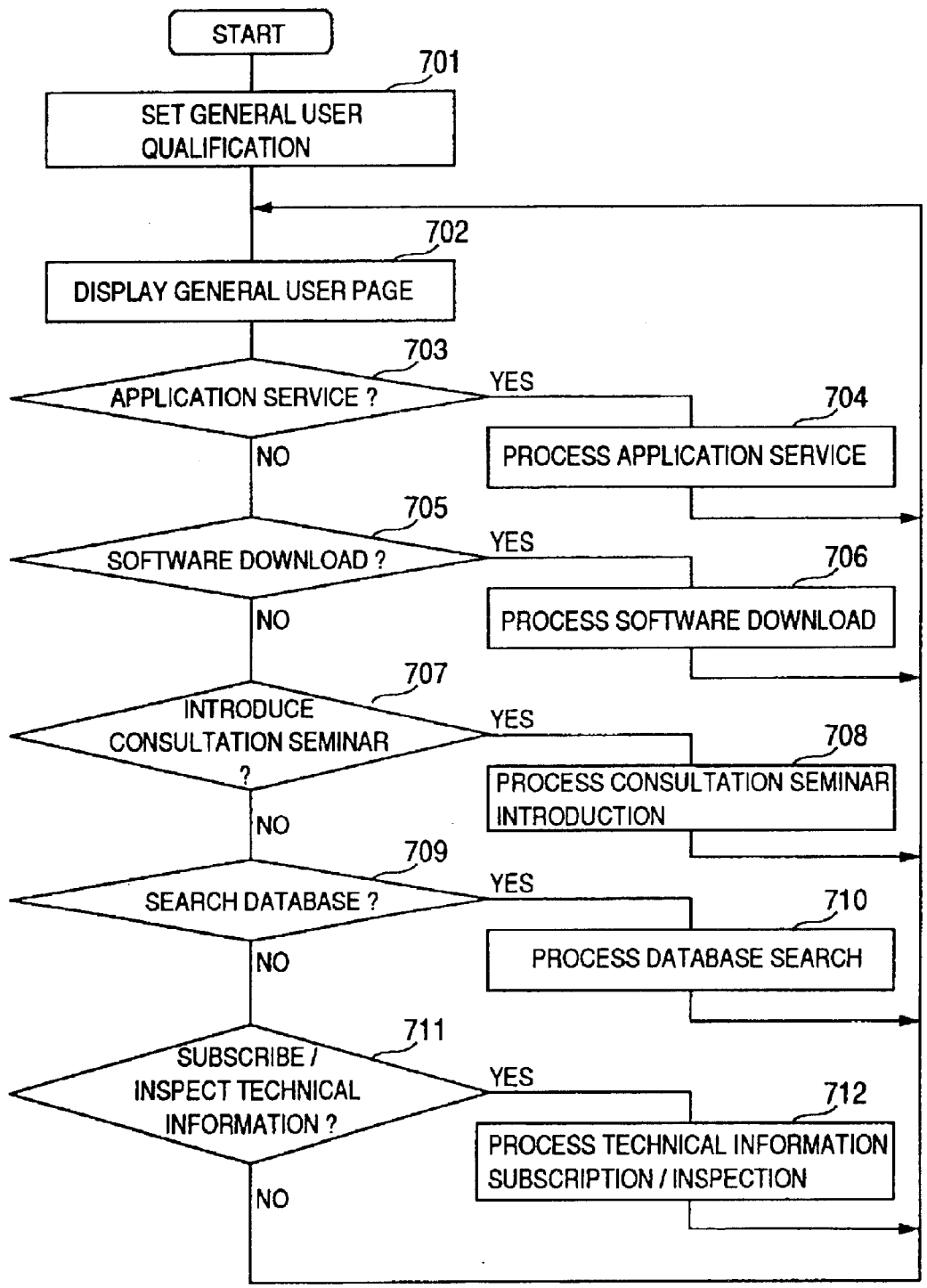

FIG.8

GENERAL USER PAGE

SERVICE SYSTEM

● APPLICATION SERVICE

WE LEASE A SYSTEM NECESSARY FOR DESIGNING WORK DURING THE TERM OF AGREEMENT THROUGH THE INTERNET ONEROUSLY.

WE ARE CURRENTLY PROVIDING → 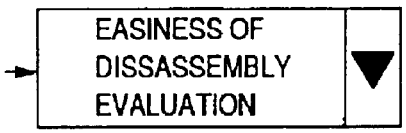

● SOFTWARE DOWNLOAD SALE

YOU CAN EASILY PURCHASE SOFTWARE USEFUL FOR DESIGNING WORK THROUGH THE INTERNET. YOU CAN USE RIGHT AFTER DOWNLOADING.

WE ARE CURRENTLY PROVIDING → 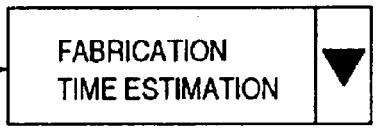

● CONSULTATION SEMINAR INTRODUCTION

WE INTRODUCE CONSULTATIONS AND SEMINARS FOR DIRECTLY SUPPORTING KNOW-HOW USEFUL FOR DESIGNING WORK.

WE ARE CURRENTLY PROVIDING → 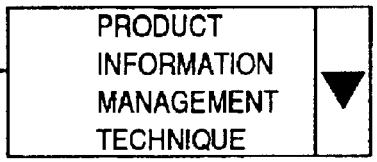

● DATABASE SEARCH SERVICE

DATABASE IN WHICH INFORMATION NECESSARY FOR DESIGNING WORK IS ACCUMULATED CAN BE SEARCHED THROUGH INTERNET DURING THE TERM OF AGREEMENT ONEROUSLY.

WE ARE CURRENTLY PROVIDING → 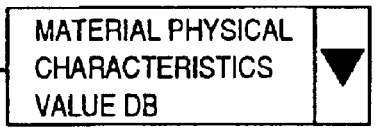

● TECHNICAL INFORMATION SUBSCRIPTION / INSPECTION

TECHNICAL DOCUMENTS RELATING TO DESIGNING WORK IS ISSUED PERIODICALLY AND CAN BE SUBSCRIBED THROUGH THE INTERNET FOR THE TERM OF AGREEMENT ONEROUSLY.

WE ARE CURRENTLY PROVIDING → 

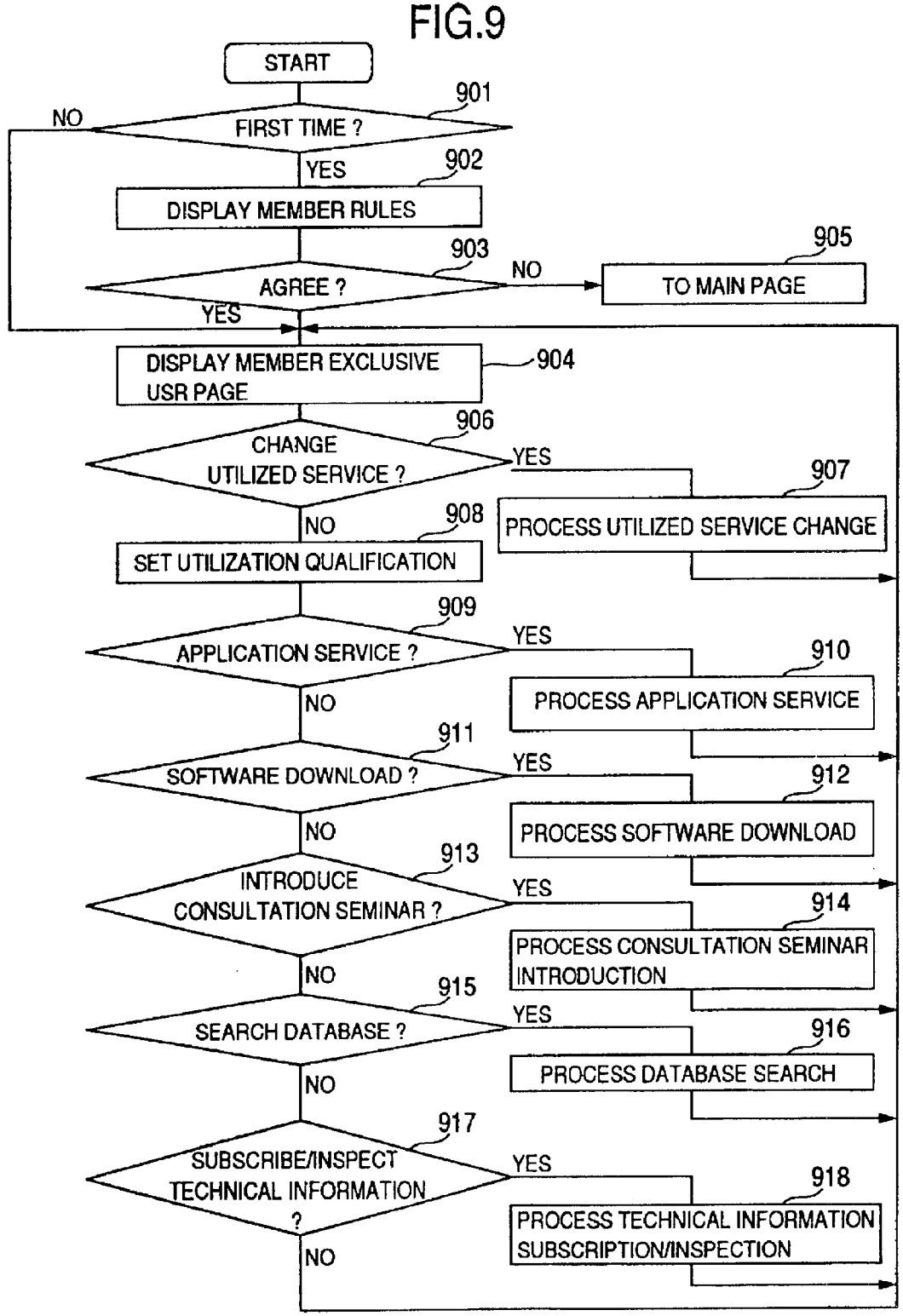

FIG.10

MEMBER RULES

⋮

(CONFIDENTIALITY)
ARTICLE 17
 A MEMBER AND THE COMPANY A SHALL NOT REVEAL BUSINESS
SECRETS OF THE OTHER PARTY OR A THIRD PARTY A THIRD PARTY
WITHOUT A DISCLOSING PARTY'S CONSENT. HOWEVER,
THIS PROVISION SHALL NOT APPLY IF ANY OF THE FOLLOWING
SHALL APPLY:
(1) A SECRET HAD BEEN ALREADY IN POSSESSION LAWFULLY WHEN IT
    BECAME AVAILABLE FROM THE DISCLOSING PARTY;
(2) A SECRET WAS UNIQUELY DEVELOPED;
(3) A SECRET WAS LAWFULLY OBTAINED FROM A THIRD PARTY
    WITHOUT ANY CONFIDENTIALITY OBLIGATION; AND
(4) A SECRET BECOMES WIDELY KNOWN.

⋮

AGREE    DISAGREE

FIG.20

| | |
|---|---|
| INQUIRY PAGE | |
| REQUESTER PAGE | INTRODUCE EASINESS OF DISASSEMBLY EVALUATION |
| KEYWORD | EASINESS OF DISASSEMBLY EVALUATION |
| SUB-KEYWORD | EVALUATION TECHNIQUE |
| | OUTLINE OF SERVICE |
| | EVALUATION TECHNIQUE |
| | MASS PRODUCTION PARTS |
| | NON-MASS PRODUCTION PARTS |
| | PREREQUISITE ENVIRONMENT |
| | TRIAL VERSION |
| | UTILIZATION FEE |
| INQUIRY CLASSIFICATION | INQUIRY |
| | INQUIRY |
| | REQUEST MATERIAL |
| | APPLICATION |
| | REMARKS |
| NAME | ○○×× |
| E-mail : | ××@aaa |
| DESIGNATED TITLE | ABOUT EVALUATION TECHNIQUE DETAILS |
| INQUIRY CONTENTS | PLEASE INDICATE DETAILS OF EVALUATION TECHNIQUE. |

[ TRANSMIT ]
[ CANCEL ]
[ OTHER FORM ]

---

INQUIRY MAIL

MAIL TITLE    EASINESS OF DISASSEMBLY EVALUATION - INQUIRY - ABOUT DETAILS OF EVALUATION TECHNIQUE

MAIL TEXT    <DATE OF TRANSMISSION>
<REQUESTER PAGE>
  INTRODUCTION OF EASINESS OF DISASSEMBLY EVALUATION
<SUB-KEYWORD>
  EVALUATION TECHNIQUE
<NAME>
<E-MAIL>
<INQUIRY CONTENTS>
  PLEASE INDICATE DETAILS OF EVALUATION TECHNIQUE.

FIG.22

XX SERVICE UTILIZATION APPLICATION FORM AND UTILIZATION AGREEMENT

I/WE APPLY FOR THE UTILIZATION OF XX SERVICE UPON AGREEING TO THE SERVICE UTILIZATION RULES.
PAYMENT OF THE UTILIZATION CHARGES SHALL BE MADE AS WRITTEN IN THE SEPARATE SHEET.

DATE OF APPLICATION

| APPLICANT | NAME OF CORPORATION | |
| --- | --- | --- |
| | NAME OF OFFICE | |
| | NAME OF DEPARTMENT | |
| | NAME OF REPRESENTATIVE | |
| | ADDRESS | 印 |
| | TELEPHONE NUMBER | |

| USER | NAME OF OFFICE | |
| --- | --- | --- |
| | NAME OF DEPARTMENT | |
| | MEMBER ID | |
| | USER NAME | 印 |
| | ADDRESS | |
| | TELEPHONE NUMBER | |
| | E-mail | |

NOTICE OF APPROVAL OF SERVICE UTILIZATION
YOUR APPLICATION FOR UTILIZATION HAS BEEN APPROVED.

KABUSHIKI KAISHA XXXX    XXXX OFFICE
　　ADDRESS
　　REPRESENTATIVE

DATE

印

… (US 6,850,963 B1)

METHOD OF PROVIDING SUBSCRIPTION BASED INFORMATION SERVICES THROUGH AN INFORMATION SERVICE PROVIDER

BACKGROUND OF THE INVENTION

The present invention relates to an information service providing system for providing information service, more particularly to a technology that is applied effectively to an information service providing system for providing other entities with know-how accumulated in an entity.

As a conventional system for selling digital contents, sales of various contents have been proposed. For example, JP-A-11-345261 specification (laid-open on Dec. 14, 1999) describes a contents management system and a storage medium for realizing sales management and utilization management for each content by transmitting a permission to utilize and a result of the utilization to a center apparatus and managing them when contents are output by a terminal.

On the other hand, a number of technical development have been conducted in research and development organizations such as various kinds of enterprises, universities or the like, and knowledge and learning obtained through these technical developments are made known to the public in the form of press releases, academic announcements or the like. However, some of the knowledge and the learning are kept secret by a research and development organization in order to maintain competitiveness against other research and development organizations or are put to practical use only within an research and development organization due to reasons such as the one that a technology is still under development. Since a research and development organization has an aspect that it can keep predominance by keeping secret such know-how accumulated within it, the know-how is not generally sold to outside the organization as various kinds of information services.

There is a problem that providing other organizations with such know-how accumulated in the research and development organization is difficult with the above-mentioned conventional system for selling digital contents because, if the know-how is provided utilizing the system, the secret is hard to be kept.

Further, since specifications and methods of utilization of some technologies accumulated within a company as know-how are considerably changed, it is possible that the maintenance of the technologies is difficult once they are provided other entities with.

In addition, since a characteristic of the recently spreading Internet is the free use by individuals, even if know-how such as the above-mentioned one is provided over the Internet, researchers, technicians or the like utilize the know-how out of their personal demands. On the other hand, since these individuals utilize know-how providing services as a part of their jobs, corporations they belong to bear utilization fees and a specific idea is required for user management of the services for providing know-how.

Moreover, if a business for providing other entities with know-how is conducted, it is preferable to collect a multiplicity of kinds of know-how accumulated in a company and other companies to form a list of abundant items rather than to provide a single piece of know-how existing in a company. In such a case, it is expected that manifold inquiries are sent to a inquiry counter of a company from users of the service and, since the inquiries consist of technical terms in various fields because what is provided is know-how, there is a possibility that it is hard for the inquiry counter to process the inquiries by understanding them and transfer them to departments in charge of answers.

SUMMARY OF THE INVENTION

An object of the present invention is to solve the above-described problems and provide a technology capable of efficiently providing an information service with high confidentiality.

Another object of the present invention is to provide a technology capable of providing an information service with high confidentiality without presenting detailed processing contents.

Another object of the present invention is to provide a technology capable of providing an information service that is expected to be used for a personal use of an individual belonging to a corporation.

Yet another object of the present invention is to provide a technology capable of smoothly coping with inquiries from users of the service in conducting a service business consisting of highly professional and abundant items in various fields.

The present invention is to provide an information service corresponding to the qualification of a customer to use the service in an information service providing system for providing an information service.

In an information service providing system of the present invention, contents of each of various kinds of services to be provided customers with are classified in accordance with the level of confidentiality in advance. When the provision of an information service is requested by a customer, the system receives the request and checks the qualification of the customer to use the system showing the obligation of confidentiality agreed upon in utilizing the information service. The system then determines the contents that the customer can utilize depending on the qualification among the contents of information services that the customer requests to be provided with and provides the customers with the information service with its contents thus determined.

As described above, since contents of an information service to be provided are changed depending on a qualification of a customer to use the service showing the obligation of confidentiality of the customer with the present invention, an information service with high confidentiality can be properly provided.

In addition, in an information service providing system of the present invention, when provision of an information service is requested by a customer, the system receives, from the customer, data necessary for the customer to receive the provision of the information service, converts the data to be in conformity with an interface in the provider side for providing the information service, generates data necessary for the provision of the information service and transmits the generated data to the provider side for providing the information service.

The provider side of the information service executes the processing for providing the information service using the data transmitted from the requester side requesting the information service and transmits the execution results acquired by the execution to the requester side of the information service.

The requester side of the information service outputs the execution results transmitted from the provider side of the information service and provides the customer with the information service.

As described above, the present invention can provide the execution results only as the information service without providing the customer with a program containing design know-how or the like that cannot be published in detail or a program requiring a specific environment for operation because the processing for providing the information service is executed in the provider side of the information service and only the execution results are sent to the requester side of the information service. In addition, if the contents of the know-how and the operation environment are changed, it is sufficient to perform only the update or the like of the program in the provider side of the information service and, if the method of utilization is changed in the customer side such as an interface for input data or the like, a program in the requester side for generating data necessary for the provision of the information service, it is sufficient to change the program in the requester side for generating data necessary for the information service, therefore, it is possible to control the customer's costs as minimum as possible when a technical specification and the method of utilization are changed.

In addition, in the information service providing system of the present invention, a page for subscription of the information service utilization for a customer to subscribe for the utilization of respective provided information services is provided. When a customer subscribes for utilization of a certain information service on the page, an official agreement is separately entered into between the information service provider and the customer concerning the utilization of the information service. Thereafter, the customer can utilize the information service.

Further, it is also possible to use a method for provisionally set for each information service to be provided the qualification for using the information service at the time when the customer subscribes for utilization on the page for subscription of the information service utilization. In this case, if the information provider and the customer cannot enter into an official agreement for the utilization of the information service by a predetermined date or the credit standing of the customer is not acceptable, the qualification for utilizing the information service is canceled.

As described above, in accordance with the present invention, the customer can subscribe for the utilization of the information service over the information service providing system and thereafter conclude a formal agreement, which makes it easier for the customer to subscribe for the information service and, on the other hand, makes it possible to perform the examination of the client's credit standing and implement the information service with high confidentiality. Further, even in the case where it takes time until the formal agreement is concluded due to, for example, exchange of agreements by mail, since the client can commence the utilization of the information service upon subscribing for the service over the information service providing system if the confidentiality of the information service is not so high, the convenience for the client is increased.

In addition, in the information service providing system of the present invention, in the case where a person having subscribed for the utilization of the information service has the record of concluding a formal agreement in utilizing any of the information services provided by the information service provider in the past, it is possible to use a method that makes it unnecessary to conclude a new formal agreement by formally permitting the utilization of an information service newly subscribed for at the time of subscription if the new subscription for the utilization of other information services is performed over the information service providing system by the information service provider.

In accordance with the invention described above, a customer who can be regarded as credible by the information service provider, such as the one having the record of utilizing a certain information service provided by the information service provider and having concluded a formal agreement and a credit, can utilize a new information service simply by subscribing for the service over the information service system without concluding another agreement when the customer subscribes for other information services.

In addition, in an information service providing method of the present invention, it is also possible to use a method in which an individual information service user presents its name and other user information and puts its seal, or a representative of a corporation or an organization in a corporation presents the information of the corporation or the organization in the corporation such as the name of the representative and puts its seal, when a formal agreement for the information service utilization is concluded between the information service user and the information service provider.

In accordance with the present invention, in such cases as to provide know-how for technicians through a system over the Internet, a service targeting an individual information service user can be implemented by an agreement with a corporation the individual belongs to. Thereby, in conducting an agreement, for example, by writing it is possible for the information service user to subscribe for a preferred information service by its own individual desire simply by obtaining its superior's approval on the agreement and also makes it easy for the information service provider to guarantee the credibility of the individual information service user because the agreement is made in the name of the corporation on the other hand.

In addition, in the information service providing system of the present invention, an inquiry requesting function is provided in an information service page group if necessary and, when a customer makes an inquiry request from a displayed information service page, an inquiry page conforming to the inquiry is selected from an inquiry page group prepared in advance and displayed. When a customer inputs the contents of the inquiry in the inquiry page, an inquiry mail is generated from the inquiry page.

Moreover, in accordance with the present invention, it is possible to use a method for selecting an inquiry page corresponding to the information service page displayed at the time when the customer makes the inquiry request as a method for selecting the inquiry page.

Furthermore, in accordance with the present invention, processing is conducted for embedding information for identifying the information service page displayed at the time when the inquiry request was made or a keyword or the like relating to the page in a title, a text or an attached file of the inquiry mail in a regular manner.

As described above, in accordance with the present invention, since the inquiry page prepared in advance is used when the customer makes an inquiry, the client's input of inquiry is easier and the form of an inquiry mail can be unified or standardized. In addition, since the page name of the information service page displayed at the time when the inquiry request was made or a standard keyword relating to the inquiry are embedded in the inquiry mail, when the inquiry mail is sent to the inquiry counter of the information service provider, it can be easily determined which information service the inquiry relates to and what kind of the inquiry it is, which make it possible for the inquiry counter to decide a department in charge of coping with inquiries easily.

As described above, in accordance with the information service providing system of the present invention, since an information service corresponding to a qualification of a customer to use the system is provided, it is possible to provide an information service with high confidentiality efficiently.

In addition, it is also possible to provide a technology for realizing an information service business that provides an information service that is highly professional and is supposed to be used by an individual belonging to a corporation for its personal use.

BRIEF DESCRIPTION OF THE DRAWINGS

In the accompanying drawings,

FIG. 1 is a schematic illustration showing an information service providing system of an embodiment of the present invention;

FIG. 2 is a schematic illustration showing the configuration of a content of provision controlling apparatus 100 of an embodiment of the present invention;

FIG. 3 is a schematic illustration showing the configuration of a content providing apparatus 110 of an embodiment of the present invention;

FIG. 4 is a schematic illustration showing the configuration of an information providing service apparatus 120 of an embodiment of the present invention;

FIG. 7 is a flow chart showing processing procedures of a general user page of an embodiment of the present invention;

FIG. 8 illustrates an example of a general user menu of an embodiment of the present invention;

FIG. 9 is a flow chart showing processing procedures of a member exclusive use page of an embodiment of the present invention;

FIG. 10 illustrates an example of a member rules page of an embodiment of the present invention;

FIG. 20 illustrates an example of an example of an inquiry page in transmitting procedures and an example of an inquiry mail generated from the inquiry page of an embodiment of the present invention;

FIG. 22 illustrates an example of a subscription and agreement form for information service utilization of an embodiment of the present invention.

DETAILED DESCRIPTION OF THE EMBODIMENTS

Figure 5:
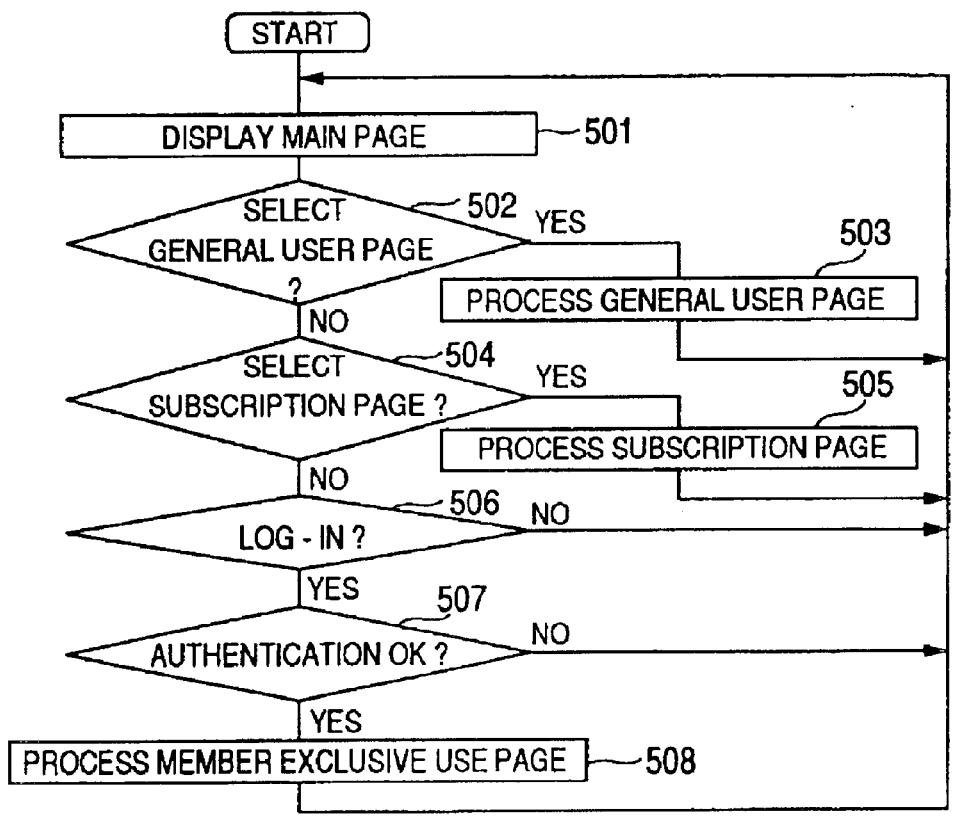
FIG. 5 is a flow chart showing processing procedures of an information service providing main page of an embodiment of the present invention.

An information service providing system of an embodiment for providing an outside company with an information service including company know-how or the like with high confidentiality will now be hereinafter described.

FIG. 1 shows a schematic illustration of an information service providing system of this embodiment. As shown in FIG. 1, the information service providing system of this embodiment has a contents of provision controlling apparatus 100, a contents providing apparatus 110 and an information providing service apparatus 120. Here, the Internet, for example, may be utilized as a network portion.

The contents of provision controlling apparatus 100 is an information processing apparatus for receiving a providing request of an information service from the information providing service apparatus 120, determining the contents of an information service to be provided and instructing the contents providing apparatus 110 to provide the information service.

The contents providing apparatus 110 is a providing side apparatus for executing processing for providing the information service based on the instruction from the contents of provision controlling apparatus 100. The information providing service apparatus 120 is a requesting side apparatus for requesting the provision of a specific information service based on an instruction from a customer.

FIG. 2 is a schematic illustration of the contents of provision controlling apparatus 100 of this embodiment. As shown in FIG. 2, the contents of provision controlling apparatus 100 has a CPU 201, a memory 202, a magnetic disc device 203, a keyboard device 204, a display device 205, a CE-ROM device 206 and a member information 207.

The CPU 201 is a device for controlling the operation of the entire contents of provision controlling apparatus 100. The memory 202 is a storage in which various kinds of processing programs and data for controlling the operation of the entire contents of provision controlling apparatus 100 are loaded.

The magnetic disc device 203 is a storage for storing the various kinds of processing programs and the data. The keyboard device 204 is a device for performing various kinds of inputting operations for determining the contents of the information service to be provided. The display device 205 is a device for conducting various kinds of displays in conjunction with the determination of the contents of the information service to be provided.

The CD-ROM device 206 is a device for reading out the contents of a CD-ROM recording the various kinds of processing programs. The member information 207 is information of members admitted to be provided with an information service.

In addition, the contents of provision controlling apparatus 100 has a receipt processing portion 210, a utilization qualification setting processing portion 211 and a contents of provision determination processing portion 212.

The receipt processing portion 210 is a processing portion for receiving an information service requested by a customer to be provided with. The utilization qualification setting processing portion 211 is a processing portion for determining the utilization qualification showing an obligation of confidentiality with respect to the information service of the customer. The contents of provision determination processing portion 212 is a processing portion for determining the contents available by the utilization qualification among the contents of the information service requested by the customer to be provided with.

A program for causing the contents of provision controlling apparatus 100 to function as the receipt processing portion 210, the utilization qualification setting processing portion 211 and the contents of provision determination processing portion 212 shall be recorded in a recording media such as a CD-ROM and stored in a magnetic disc or the like, and then loaded in a memory to be executed. Further, a recording medium for recording the program may be a recording medium other than a CD-ROM.

FIG. 3 is a schematic illustration of the configuration of the contents providing apparatus 110 of this embodiment. As shown in FIG. 3, the contents providing apparatus 110 of this embodiment has a CPU 301, a memory 302, a magnetic disc device 303, a keyboard device 304, a display device 305, a CD-ROM device 306 and contents 307.

The CPU 301 is a device for controlling the operation of the entire contents providing apparatus 110. The memory 302 is a storage in which various kinds of processing programs and data for controlling the operation of the entire contents providing apparatus 110 are loaded.

The magnetic disc device 303 is a storage for storing the various kinds of processing programs and data. The keyboard device 304 is a device for performing various kinds of inputting operations for providing an information service based on an instruction from the contents of provision controlling apparatus 100.

The display device 305 is a device for conducting various kinds of displays in conjunction with the provision of the information service based on the instruction from the contents of provision controlling apparatus 100. The CD-ROM device 306 is a device for reading out the contents of the CD-ROM recording the various kinds of processing programs.

The contents 307 are information introducing a processing program, a database and literature information containing design know-how or the like that cannot be published in detail and explanations thereon as well as a consultation seminar for providing design know-how or the like that cannot be published in detail.

In addition, the contents providing apparatus 110 has an information service provision processing portion 310, an information service execution processing portion 311 and an execution results transmission processing portion 312.

The information service provision processing portion 310 is a processing portion for providing an information service of the contents determined by the contents of provision controlling apparatus 100. The information service execution processing portion 311 is a processing portion for conducting an application processing for providing the information service by executing a program containing design know-how or the like that cannot be published in detail and a program requiring a specific environment for operation using data transmitted from the information providing service apparatus 120 in the requesting side that requires the provision of the information service. The execution results transmission processing portion 312 is a processing portion for transmitting the execution results obtained by the execution to the information providing service apparatus 120 in the requesting side of the information service.

A program for causing the contents providing apparatus 110 to function as the information service provision processing portion 310, the information service execution processing portion 311 and the execution results transmission processing portion 312 shall be recorded in a recording media such as a CD-ROM and stored in a magnetic disc or the like, and then loaded in a memory to be executed. Further, a recording medium for recording the program may be a recording medium other than a CD-ROM.

FIG. 4 is a schematic illustration for showing the configuration of the information providing service apparatus 120 of this embodiment. As shown in FIG. 4, the information providing service apparatus 120 of this embodiment has a CPU 401, a memory 402, a magnetic disc device 403, a keyboard device 404, a display device 405, a CD-ROM device 406 and a data file 407.

The CPU 401 is a device for controlling the operation of the entire information providing service apparatus 120. The memory 402 is a storage in which various kinds of processing programs and data for controlling the operation of the entire information providing service apparatus 120 are loaded.

The magnetic disc device 403 is a storage for storing the various kinds of processing programs and the data. The keyboard device 404 is a device for performing various kinds of inputting operations for requesting the provision of a specific information service. The display device 405 is a device for conducting various kinds of displays in conjunction with the request for providing the specific information service.

The CD-ROM device 406 is a device for reading out the contents of a CD-ROM recording the various kinds of processing programs. The data file 407 is a file for storing data necessary for application processing executed at the time of providing the information service.

In addition, the information providing service apparatus 120 has a data generation processing portion 410, a data transmission processing portion 411 and an execution results output processing portion 412.

The data generation processing portion 410 is a processing portion for receiving data input by a customer and generating in the data file 407 data necessary for application processing executed at the time of providing the information service. The data transmission processing portion 411 is a processing portion for transmitting the generated data to the providing side that provides the information service designated by the customer. The execution results output processing portion 412 is a processing portion for receiving the execution results transmitted from the providing side of the information service designated by the customer and outputting as the contents of provision of the information service.

A program for causing the information providing service apparatus 120 to function as the data generation processing portion 410, the data transmission processing portion 411 and the execution results output processing portion 412 shall be recorded in a recording media such as a CD-ROM and stored in a magnetic disc or the like, and then loaded in a memory to be executed. Further, a recording medium for recording the program may be a recording medium other than a CD-ROM.

FIG. 5 is a flow chart showing processing procedures of an information service providing main page. When an access to the information service providing main page for providing the information service of this embodiment is performed from the information providing service apparatus 120, the receipt processing portion 210 of the contents of provision controlling apparatus 100 transmits page information of the information service providing main page including the contents of the main menu to the information providing service apparatus 120 and waits for a response from the information providing service apparatus 120 in step 501.

Figure 6:
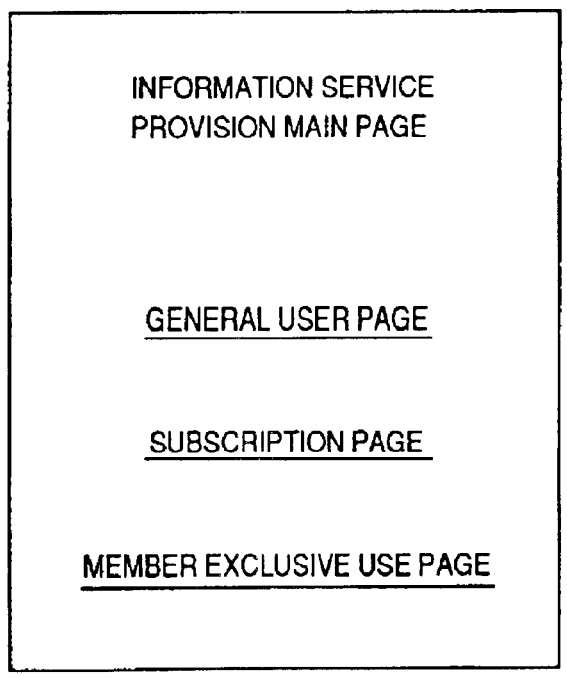
FIG. 6 illustrates an example of a main menu of an embodiment of the present invention.

FIG. 6 illustrates an example of the main menu of this embodiment. As shown in FIG. 6, in the main menu of the information service providing main page of this embodiment is provided with a link for shifting to a general user page for informing general users other than the members of the contents of the information service, a link shifting to a subscription page for performing subscription procedures when a general user becomes a member and an inputting area for inputting a member ID and a password for shifting to the member exclusive use page for the members to utilize the information service.

In step 502, the receipt processing portion 210 of the contents of provision controlling apparatus 100 receives an response from the information providing service apparatus 120 and checks if a general users page is selected, and then proceeds to step S503 if the general users page is selected and performs processing of the general users page.

In step 504, the receipt processing portion 210 performs subscription processing to check if the subscription page is selected, step 505 is followed if the subscription page is selected, with information of the subscription page being submitted to the information providing service apparatus 120 to receive the member information such as user names and electronic mail address from the information providing service apparatus 120, and numbers are automatically assigned for a member ID and a password to transmit the contents by mail.

In step 506, the receipt processing portion 210 checks if the member ID and the password are input and a log-in is instructed and, if a log-in is instructed, determines if the password is correct or not in step 507. If the input password is the correct password, the receipt processing portion 210 proceeds to step 508 and processed the member exclusive use page.

FIG. 7 is a flow chart showing processing procedures of the general users page of this embodiment. In step 701, the utilization qualification setting processing portion 211 of the contents of provision controlling apparatus 100 sets a value indicating that a user is a general person other than a member to a utilization qualification variable.

In step 702, the utilization qualification setting processing portion 211 transmits the information of the general users page to the information providing service apparatus 120 and waits for a response from the information providing service apparatus 120.

FIG. 8 illustrates an example of the general users menu of this embodiment. As shown in FIG. 8, items for explaining the contents of each information service for general users are set in the general users menu in the general users page of this embodiment.

In step 703, the receipt processing portion 210 of the contents of provision controlling apparatus 100 receives a response from the information providing service apparatus 120 and checks if an application service is selected and, if the application service is selected, proceeds to step 704 and processes the application service.

In step 705, the receipt processing portion 210 checks if the software download sale is selected or not and, if the software download sale is selected, proceed to step 706 and processes the software download sale.

In step 707, the receipt processing portion 210 checks if the consultation seminar is selected or not and, if the consultation seminar is selected, proceeds to step 708 and processes the consultation seminar.

In step 709, the receipt processing portion 210 checks if the database search service is selected or not and, if the database search service is selected, proceeds to step 710 and processes the database search service.

In step 711, the receipt processing portion 210 checks if the technical information subscription and inspecting is selected or not and, if the technical information subscription and inspecting is selected, proceeds to step 712 and processes the technical information subscription and inspecting.

FIG. 9 is a flow chart showing processing procedures of the members exclusive use page of this embodiment. In step 901, the receipt processing portion 210 of the contents of provision controlling apparatus 100 checks if the utilization of the members exclusive use page by the member ID is the first time or not and, if it is the first time, proceeds to step 902 or, if it is not the first time, proceeds to step 904.

In step 902, the receipt processing portion 210 transmits the information of the member rules page to the information providing service apparatus 120 and waits for a response from the information providing service apparatus 120.

FIG. 10 illustrates an example of the member rules page of this embodiment. As shown in FIG. 10, contents of the member rules stipulating the obligation of confidentiality of members in the case where there is no stipulation of the obligation of confidentiality in by a trial rules or an agreement and buttons for inputting whether a user agrees on the contents or not are displayed in the member rules page of this embodiment.

In step 903, the receipt processing portion 210 receives a response from the information providing service apparatus 120 and checks if a customer agrees on the member rules or not and, if the customer agrees on the member rules, proceeds to step 904 or, if the customer does not agree on the member rules, proceeds to step 905 and returns to the information service providing main page.

In step 904, the receipt processing portion 210 transmits the information of the members exclusive use page to the information providing service apparatus 120 and waits for a response from the information providing service apparatus 120.

Figure 11:
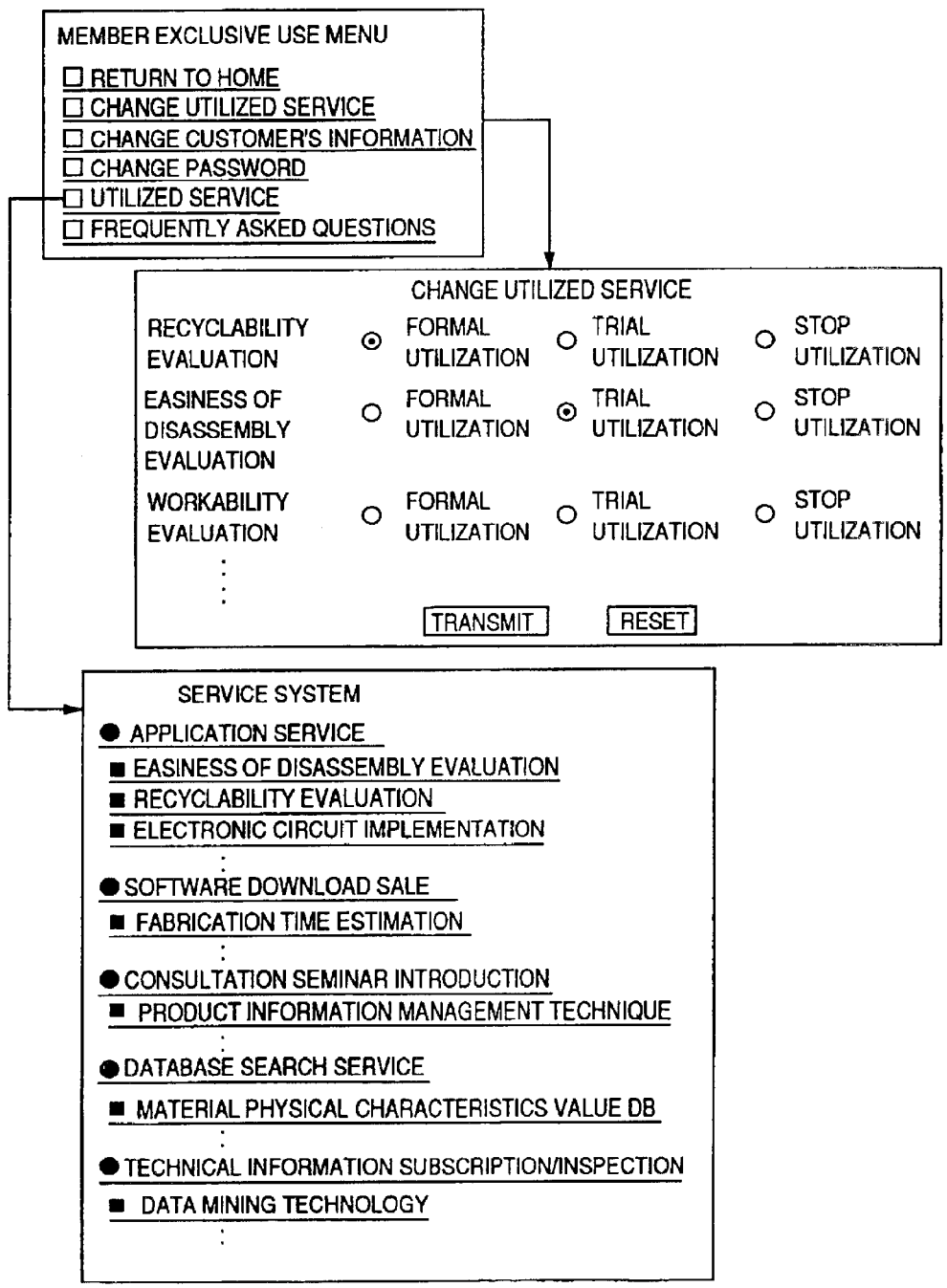
FIG. 11 illustrates an example of a member exclusive use menu of an embodiment of the present invention.

FIG. 11 illustrates an example of the members exclusive use menu of this embodiment. As shown in FIG. 11, the items for members to utilize each information service are set in the members exclusive use menu of the members exclusive use page of this embodiment.

In step 906, the receipt processing portion 210 receives a response from the information providing service apparatus 120 and checks if the change of the utilized service is selected or not and, if the change of the utilized service is selected, proceeds to step 907 and changes the utilized service.

Figure 12:
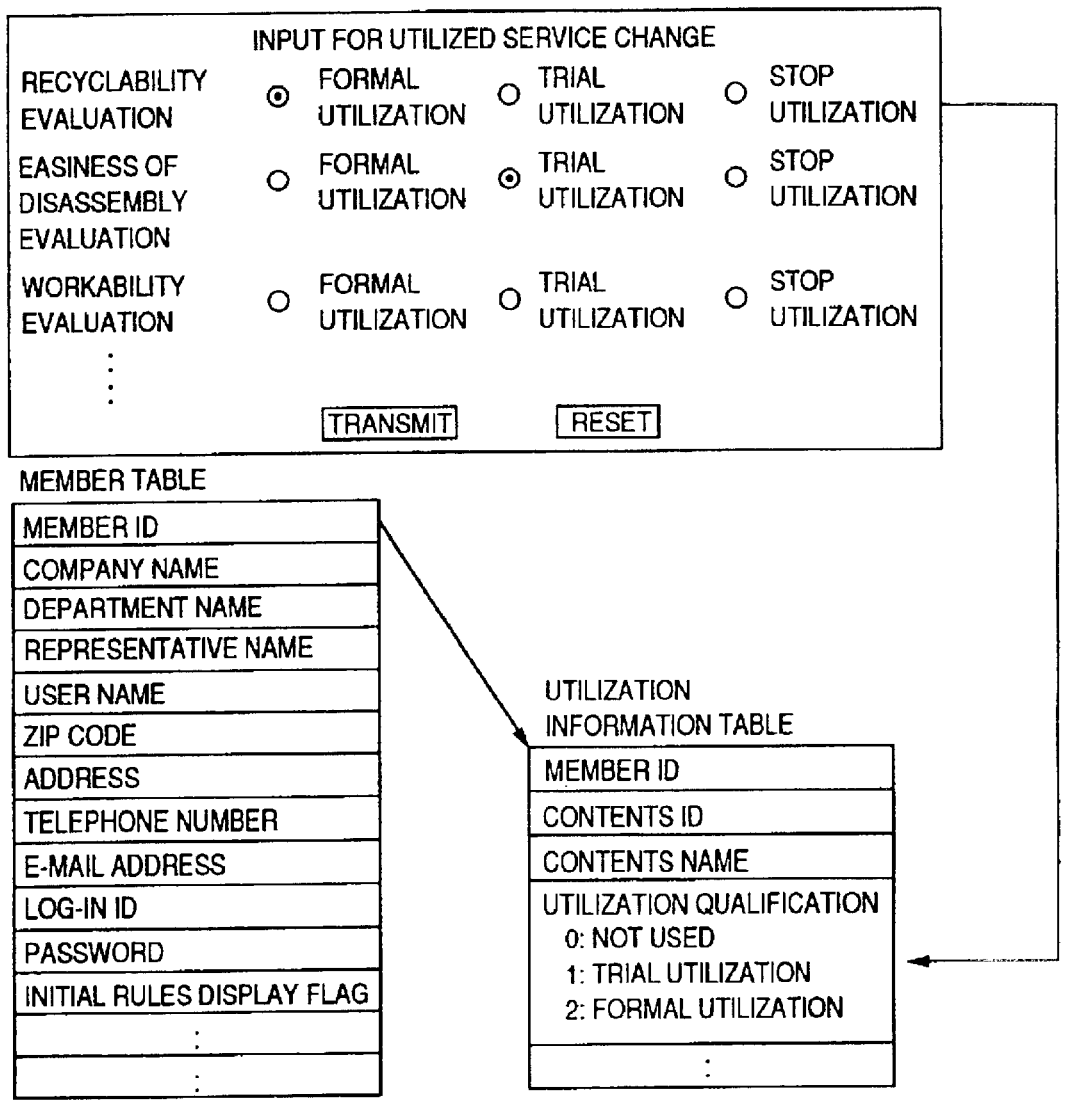
FIG. 12 illustrates an example of a change of a service to be utilized and an example of member information of an embodiment of the present invention.

FIG. 12 illustrates an example of the change of the utilized service and the member information of this embodiment. As shown in FIG. 12, one of the formal utilization, a trial utilization and the stopping utilization is selected for each service in the change of the utilized service.

When the formal utilization is selected here, an agreement containing the obligation of confidentiality for the information service and an application form for making a credit debit from an account for the payment of the utilization fee are sent to a customer and, after a formal agreement and a credit is concluded, a utilization qualification indicating that the information service can be formally utilized is set in the utilization information table of the member information. In this embodiment, in the formal utilization, a customer shall bear the obligation of confidentiality in accordance with the contents of the agreement. Further, in the case where an agreement and an application form for deduction from an account are mailed, if time is required for a formal agreement and a credit, a utilization qualification indicating that the information service can be formally utilized may be provisionally set in the utilization information table of the member information so that, if a formal agreement or a credit cannot be concluded by a predetermined date, the provisionally set utilization qualification is canceled. The above-mentioned method for setting a formal utilization qualification provisionally is hereinafter referred to as the provisional utilization available method.

In addition, an information service user who has once formally utilized the information service in the past and has concluded a formal agreement and a credit may be permitted to utilize the information service even if the user does not repeat a formal agreement and a credit if the user wishes to utilize another information service. This method is hereinafter referred to as the individual agreement unnecessary method. Whether the individual agreement unnecessary method or the provisional utilization available method is adopted may be set for each service depending on the degree of confidentiality of respective services provided by the information service provider.

Figure 21:
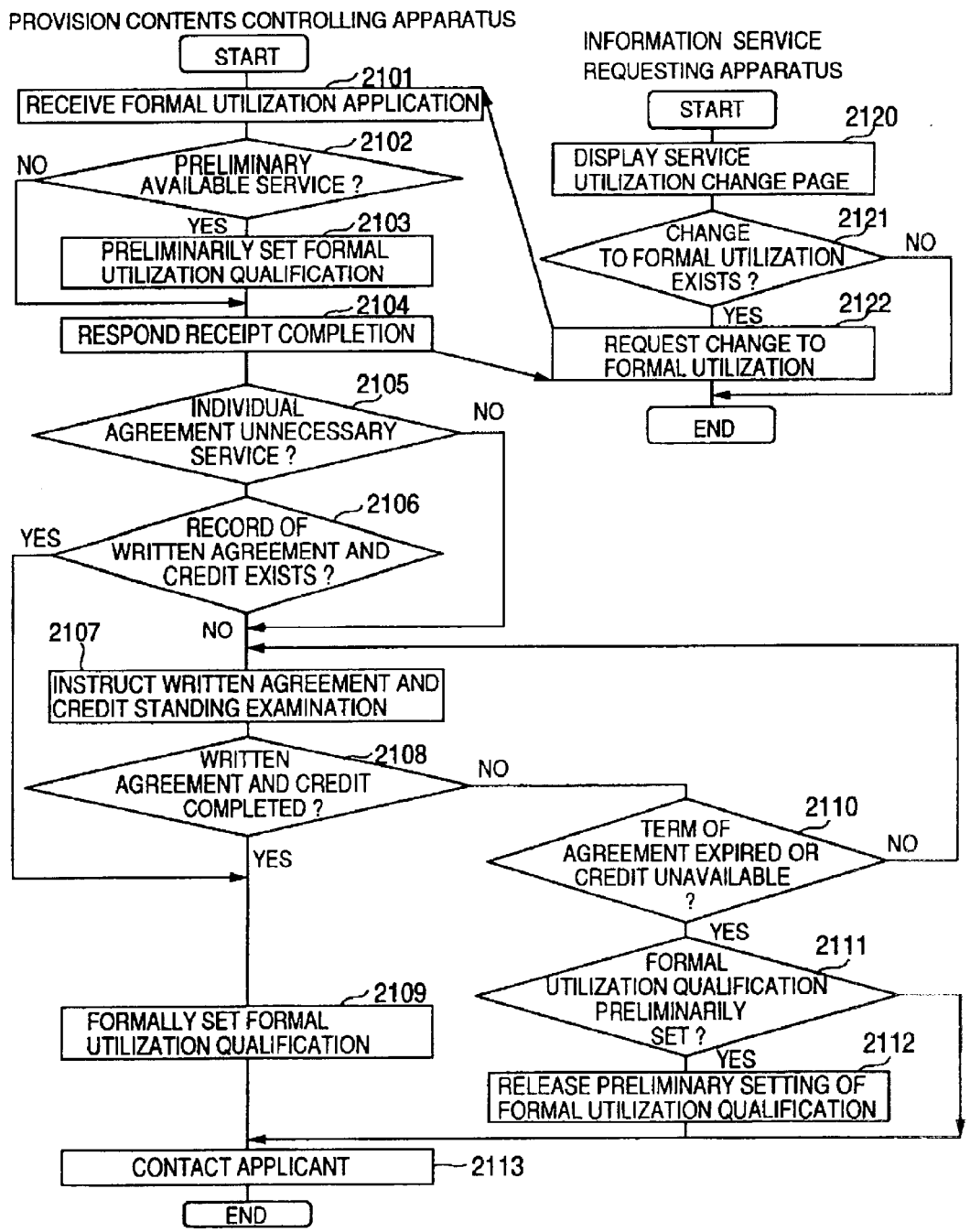
FIG. 21 is a flow chart showing an example of processing procedures for changing a qualification to use of a certain information service to a regular utilization of an embodiment of the present invention.

FIG. 21 is a flow chart showing an example of processing for changing a certain information service to the formal utilization. This is an example in which whether the provisional utilization available method or the individual agreement unnecessary method is selected is set for each service. When an information service user changes a certain information service to the formal utilization on the utilized service changing page shown in FIG. 12 in the information providing service apparatus 120, the information providing service apparatus 120 makes a request to the contents of provision controlling apparatus 100 to change the utilization qualification of the service of the user to the formal utilization in step 2120.

The information providing service apparatus 120, upon receiving a formal utilization change request in step 2101, determines whether the information service is a service corresponding to the provisional utilization available method in step 2102 and, if it corresponds to the provisional utilization available method, provisionally sets the formal utilization qualification of the service (the contents in FIG. 13) in the utilization information table of the user sown in FIG. 12 in step 2103. Further, it is convenient if a field for setting that the formal utilization qualification is provisional is provided and if a field for setting a deadline for the provisional utilization is further provided in the utilization information table. In addition, a value of provisional utilization may be set as a value of the utilization qualification field of the utilization information table other than the utilization qualification options shown in FIG. 12. Completion of the receipt of the formal utilization subscription is responded in step 2104.

In step 2105, the information providing service apparatus 120 determines whether the information service is a service corresponding to the individual agreement unnecessary method and, if it corresponds to the individual agreement unnecessary method, checks if the user concluded a formal agreement with the information service provider and a credit in the past in step 2106. If a formal agreement and a credit have been concluded in the past, the information providing service apparatus 120 proceeds to step 2109. If there is not record indicating that a formal agreement and a credit have been concluded in the past, the information providing service apparatus 120 proceeds to step 2107.

In step 2107, the information providing service apparatus 120 instructs the information service provider to conclude a formal agreement and processing of the examination of a credit standing. The information providing service apparatus 120 may further automatically send a notice instructing the user to conclude a formal agreement by an electronic mail or the like.

In step 2108, the information providing service apparatus 120 confirms if a formal agreement and a credit have been concluded and, if they have been concluded, proceeds to step 2109. If a formal agreement and a credit have not been concluded, the information providing service apparatus 120 proceeds to step 2110.

In step 2109, the information providing service apparatus 120 formally sets the formal utilization qualification in the utilization qualification of the information service of he utilization information table of the information service user.

In step 2110, the information providing service apparatus 120 proceeds to step 2111 if a credit is not acceptable or the deadline for concluding an agreement has passed. In other cases, the information providing service apparatus 120 returns to step 2107. Second or more of the instruction in step 2107 may be actually sent in an appropriate timing such as every three days and the confirmation of conclusion in step 2108 may be performed, for example, once in every business day.

In step 2111, the information providing service apparatus 120 checks if the formal utilization qualification is provisionally set in the utilization qualification of the information service of the utilization information table of the information service user and, if it is set, proceeds to step 2112. In step 2112, the cancellation of the provisionally set formal utilization qualification is processed. For this purpose, it is sufficient to change the utilization qualification of the utilization information table of FIG. 12 to the trial utilization. In step 2113, the results of the application is notified to the information service user.

In addition, when the trial utilization is selected, the utilization qualification indicating that the trial utilization of the information service is possible is set in the utilization information table of the member information of the customer. In this embodiment, at the time of this trial utilization, the customer shall bear the obligation of confidentiality in accordance with the contents of the trial utilization rules presented before the utilization.

On the other hand, when the stopping utilization is selected, the utilization qualification indicating that the information service is unused is set in the utilization information table of the member information of the customer. In this embodiment, at the time of stopping utilization, the customer shall bear the obligation of confidentiality in accordance with the member rules.

As described above, different obligations of confidentiality are set for the formal utilization, the trial utilization and the unused. The formal utilization has the most strict obligation of confidentiality and the obligation of confidentiality decreases successively for the trial utilization and the unused. A general user does not have any obligation of confidentiality.

In step 906, as a result of checking if the change of the utilization service is selected upon receiving a response from the information providing service apparatus 120, if the utilization of a specific information service is selected, the processing proceeds to step 908.

In step 908, the utilization qualification setting processing portion 211 of the contents of provision controlling apparatus 100 reads out the utilization qualification of the information service selected in step 906 from the member information of the customer and sets it in the utilization qualification variables. Here, if the utilization qualification in the utilization information table of the member information of the customer is the formal utilization, a value indicating that the user is a regular member is set in the utilization qualification variables, if it is the trial use, a value indicating that the user is a trial utilization member is set or, if it is the unused, a value indicating that the user is a voluntary member is set in the utilization qualification variables.

In step 909, the receipt processing portion 210 of the contents of provision controlling apparatus 100 checks if the application service is selected and, if the application service is selected, proceeds to step 910 and processes the application service.

In step 911, the receipt processing portion 210 checks if the software download sale is selected and, if the software download sale is selected, proceeds to step 912 and processes the software download sale.

In step 913, the receipt processing portion 210 checks if the consultation seminar introduction is selected and, if the consultation seminar introduction is selected, proceeds to step 914 and processes the consultation seminar introduction.

In step 915, the receipt processing portion 210 checks if the database search service is selected and, if the database search service is selected, proceeds to step 916 and processes the database search service.

In step 917, the receipt processing portion 210 checks if the technical information subscription and inspecting is selected and, if the technical information subscription and inspecting is selected, proceeds to step 918 and processes the technical information subscription and inspecting.

Contents of processing for the various kinds of information services selected on the general users page and the members exclusive use page of this embodiment will now be described in the same manner as above.

Figure 13:
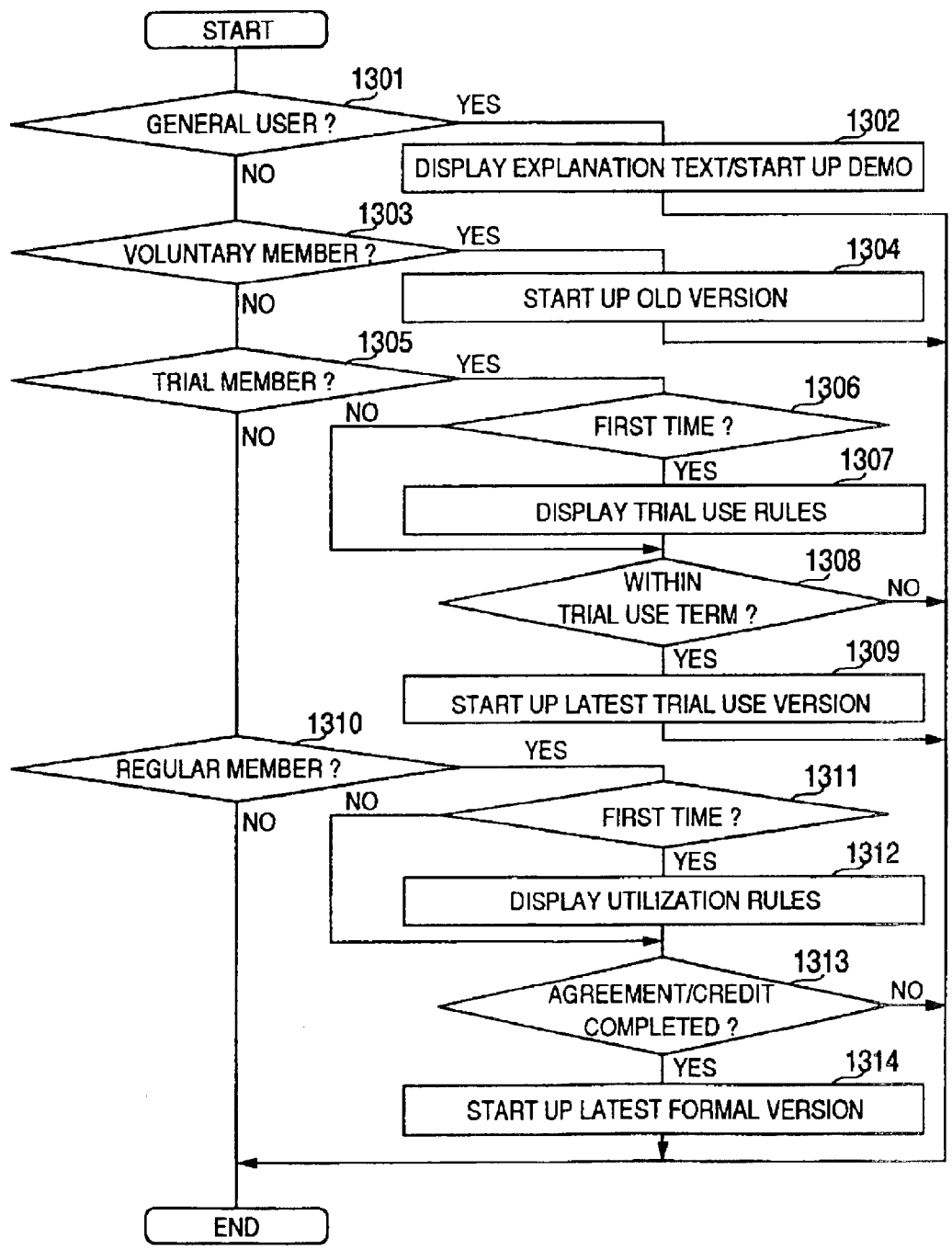
FIG. 13 is a flow chart showing processing procedures of an application service of an embodiment of the present invention.

FIG. 13 is a flow chart showing processing procedures of the application service of this embodiment. In step 1301, the contents of provision determination processing portion 212 of the contents of provision controlling apparatus 100 checks the contents of the above-mentioned set utilization qualification variables and, if the contents of the utilization qualification variables indicates a general user, proceeds to step 1302.

In step 1302, the display of the explanation of the application service that is permitted to be presented to general users and the start-up of a demo program of the application service are instructed to the contents providing apparatus 110. The information service provision processing portion 310 of the contents providing apparatus 110, upon receiving the instruction, performs the display of the explanation for general users concerning the application service and the start-up of a demo program.

In step 1303, the contents of provision determination processing portion 212 of the contents of provision controlling apparatus 100 checks the contents of the above-mentioned set utilization qualification variable and, if the utilization qualification variable indicates a voluntary member, proceeds to step 1304.

In step 1304, the contents of provision determination processing portion 212 of the contents of provision controlling apparatus 100 instructs the contents providing apparatus 110 to start-up of the old version of the application service permitted to be started up by a voluntary member. The information service provision processing portion 310 of the contents providing apparatus 110, upon receiving the instruction, performs the start-up of the old version of the application service. Period of utilization or the function may be limited, or both the period of utilization and the function may be limited for the execution of the old version.

In step 1305, the contents of provision determination processing portion 212 of the contents of in provision controlling apparatus 100 checks the contents of the above-mentioned set utilization qualification variable and, if the contents of the utilization qualification variable indicates a trial member, proceeds to step 1306.

In step 1306, the contents of provision determination processing portion 212 of the contents of provision controlling apparatus 100 checks if this trial use is the first time and, if it is the first time, displays the trial use rules and prompts a perusal in step 1307. In step 1308, the contents of provision determination processing portion 212 of the contents of provision controlling apparatus 100 checks if it is within the trial use period and, if it is within the trial use period, proceeds to step 1309 and instructs the contents providing apparatus 110 to start up the latest trial version of the application service permitted to be started up by a trial use member. The information service provision processing portion 310 of the contents providing apparatus 110, upon receiving the instruction, performs the start-up of the latest trial version of the application service. Here, the function may be limited instead of the trial use period, or both the trial use period and the function may be limited.

In step 1310, the contents of provision determination processing portion 212 of the contents of provision controlling apparatus 100 checks the contents of the above-mentioned set utilization qualification variable and, if the contents of the utilization qualification variable indicates a regular member, proceeds to step 1311.

In step 1311, the contents of provision determination processing portion 212 of the contents of provision controlling apparatus 100 checks if this formal utilization is the first time and, if it is the first time, displays the utilization rules in step 1312 and prompts a perusal in step 1312. In step 1313, the contents of provision determination processing portion 212 of the contents of provision controlling apparatus 100 confirms if an agreement and a credit are concluded and, if an agreement and a credit are concluded, proceeds to step 1314 and instructs the contents providing apparatus 110 to start up the latest formal version of the application service that is permitted to be started up by a regular member. The information service provision processing portion 310 of the contents providing apparatus 110, upon receiving the instruction, performs the start-up of the latest formal version of the application service. Further, the confirmation of conclusion of an agreement and a credit in step 1313 may be substituted by the fact that the formal utilization qualification is set in the utilization information table, and the confirmation of conclusion of an agreement and a credit in step 1313 may be omitted.

Figure 14:
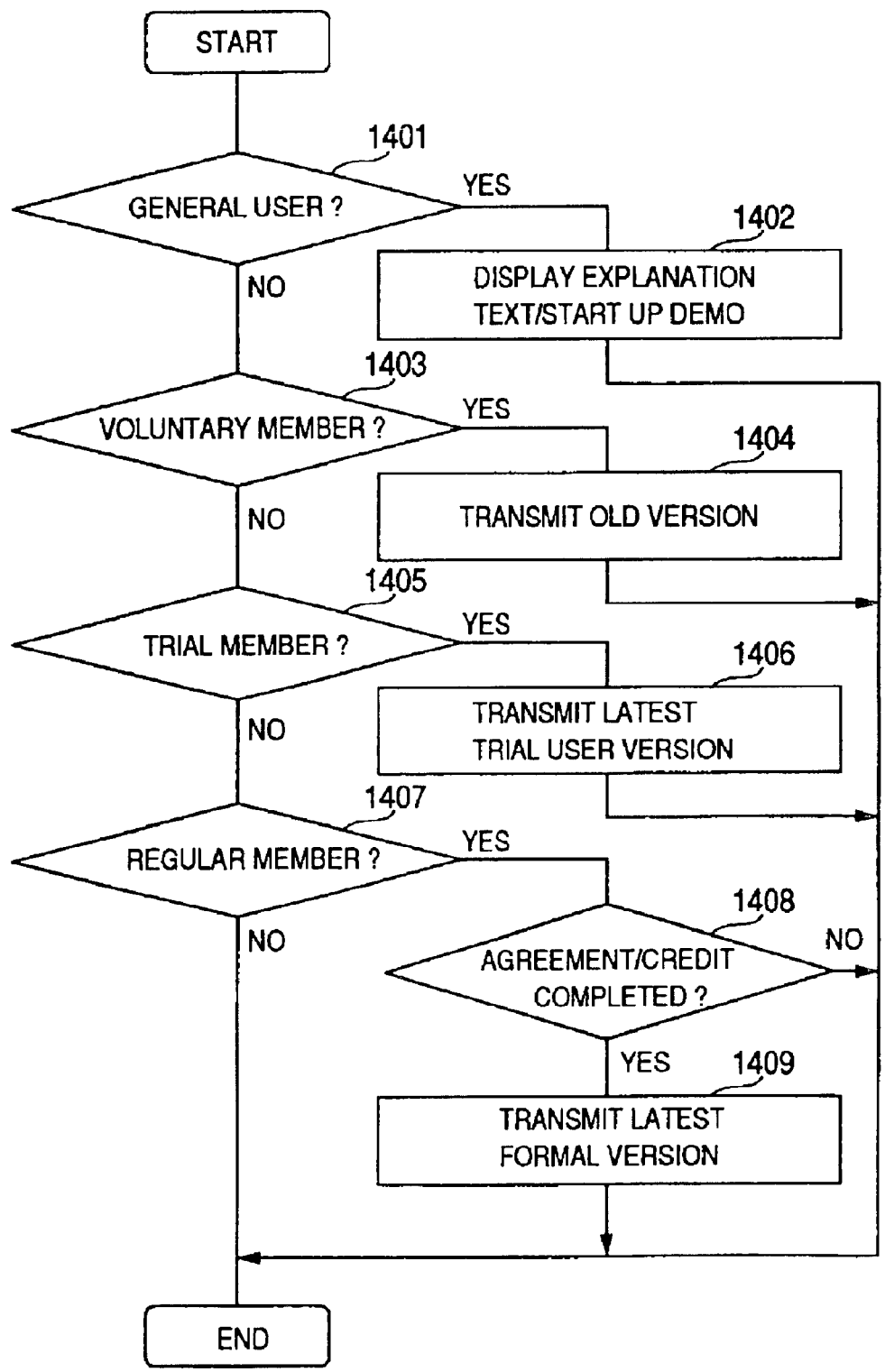
FIG. 14 is a flow chart showing processing procedures of a software download sale of an embodiment of the present invention.

FIG. 14 is a flow chart showing processing procedures of the software download sale of this embodiment. In step 1401, the contents of provision determination processing portion 212 of the contents of provision controlling apparatus 100 checks the contents of the above-mentioned set utilization qualification variable and, if the contents of the utilization qualification variable indicates a general user, proceeds to step 1402.

In step 1402, the contents of provision determination processing portion 212 of the contents of provision controlling apparatus 100 instructs the contents providing apparatus 110 to display the explanation of the software download sale permitted to be presented to a general user and to start up a demo program of the software. Upon receiving the instruction, the information service provision processing portion 310 of the contents providing apparatus 110 displays the explanation for a general user and starts up the demo program for the software download sale.

In step 1403, the contents of provision determination processing portion 212 of the contents of provision controlling apparatus 100 checks the contents of the above-mentioned set utilization qualification variable and, if it indicates a voluntary member, proceeds to step 1404.

In step 1404, the contents of provision determination processing portion 212 of the contents of provision controlling apparatus 100 instructs the contents providing apparatus 110 to transmit the old version of the software permitted to be downloaded by a voluntary member. Upon receiving the instruction, the information service provision processing portion 310 of the contents providing apparatus 110 transmits the old version of the software to the information providing service apparatus 120. Here, period of utilization or the function may be limited, or both the period of utilization and the function may be limited.

In step 1405, the contents of provision determination processing portion 212 of the contents of provision controlling apparatus 100 checks the contents of the above-mentioned set utilization qualification variable and, if it indicates a trial member, proceeds to step 1406.

In step 1406, the contents of provision determination processing portion 212 of the contents of provision controlling apparatus 100 displays the trial rules and prompts a perusal, and instructs the contents providing apparatus 110 to transmit the latest trial use version of the software whose trial period is limited. Upon receiving this instruction, the information service provision processing portion 310 of the contents providing apparatus 110 transmits the latest version of the software to the information providing service apparatus 120. Here, the function may be limited instead of the trial use period, or both the trial use period and the function may be limited.

In step 1407, the contents of provision determination processing portion 212 of the contents of provision controlling apparatus 100 checks the contents of the above-mentioned set utilization qualification variable and, if it indicates a regular member, proceeds to step 1408.

In step 1408, the contents of provision determination processing portion 212 of the contents of provision controlling apparatus 100 displays the utilization rules and prompts a perusal, and after confirming if an agreement and a credit are completed, instructs the contents providing apparatus 110 to transmit the latest formal version of the software permitted to be downloaded by a regular member. Upon receiving this instruction, the information service provision processing portion 310 of the contents providing apparatus 110 transmits the latest formal version of the software to the information providing service apparatus 120. Further, the confirmation of conclusion of an agreement and a credit in step 1408 may be substituted by the fact that the formal utilization qualification is set in the above-mentioned utilization information table, and the confirmation of conclusion of an agreement and a credit in step 1408 may be omitted.

Figure 15:
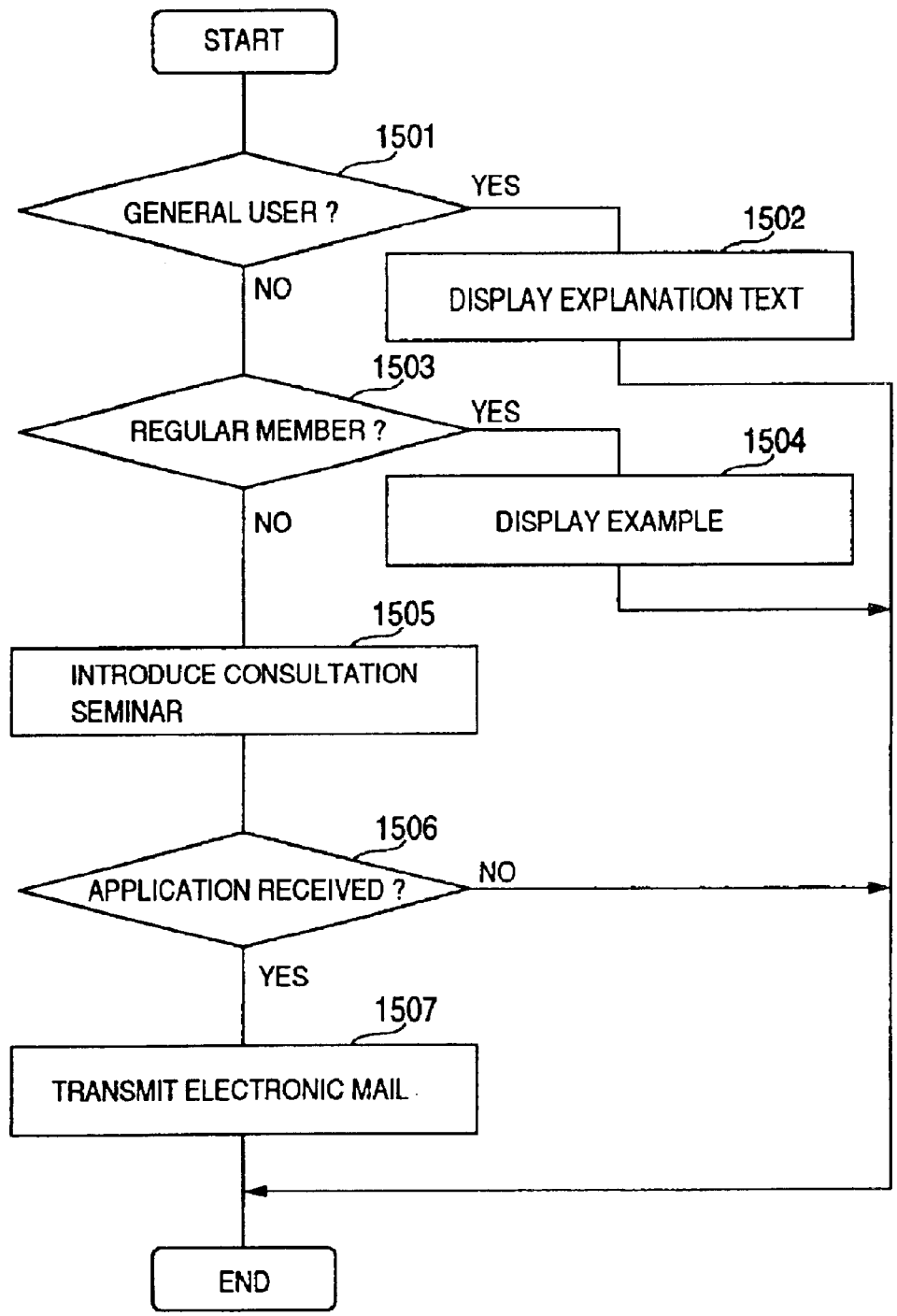
FIG. 15 is a flow chart showing processing procedures of a consultation seminar introduction on an embodiment of the present invention.

FIG. 15 is a flow chart showing processing procedures of the consultation seminar introduction of this embodiment. In step 1501, the contents of provision determination processing portion 212 of the contents of provision controlling apparatus 100 checks the contents of the above-mentioned set utilization qualification variable and, if the contents of the utilization qualification variable indicates a general user, proceeds to step 1502.

In step 1502, the contents of provision determination processing portion 212 of the contents of provision controlling apparatus 100 instructs the contents providing apparatus 110 to display the explanation of the consultation seminar introduction permitted to be presented to a general user. Upon receiving the instruction, the information service provision processing portion 310 of the contents providing apparatus 110 displays the explanation for a general user concerning the consultation seminar introduction.

In step 1503, the contents of provision determination processing portion 212 of the contents of provision controlling apparatus 100 checks the contents of the above-mentioned set utilization qualification variable and, if it doesn't indicate a regular member, proceeds to step 1504.

In step 1504, the contents of provision determination processing portion 212 of the contents of provision controlling apparatus 100 instructs the contents providing apparatus 110 to display an example of concrete contents of the consultation seminar. Upon receiving the instruction, the information service provision processing portion 310 of the contents providing apparatus 110 displays an example of concrete contents of the consultation seminar.

As a result of checking the contents of the above-mentioned set utilization qualification variable, if the contents of the utilization qualification variable indicates a regular member, the contents of provision determination processing portion 212 of the contents of provision controlling apparatus 100 proceeds to step 1505, and n step 1505, the contents of provision determination processing portion 212 of the contents of provision controlling apparatus 100 instructs the contents providing apparatus 110 to execute the consultation seminar introduction.

Upon receiving this instruction, the information service provision processing portion 310 of the contents providing apparatus 110 transmits page information of an introduction page introducing the consultation seminar in detail to the information providing service apparatus 120 and waits for a response from the information providing service apparatus 120.

In step 1506, the information service provision processing portion 310 of the contents providing apparatus 110 receives a response from the information providing service apparatus 120 and checks if an application for the consultation seminar has been made and, if the application has been made, proceeds to step 1507 to transmit the above-mentioned application contents to the promoter of the consultation seminar.

Figure 16:
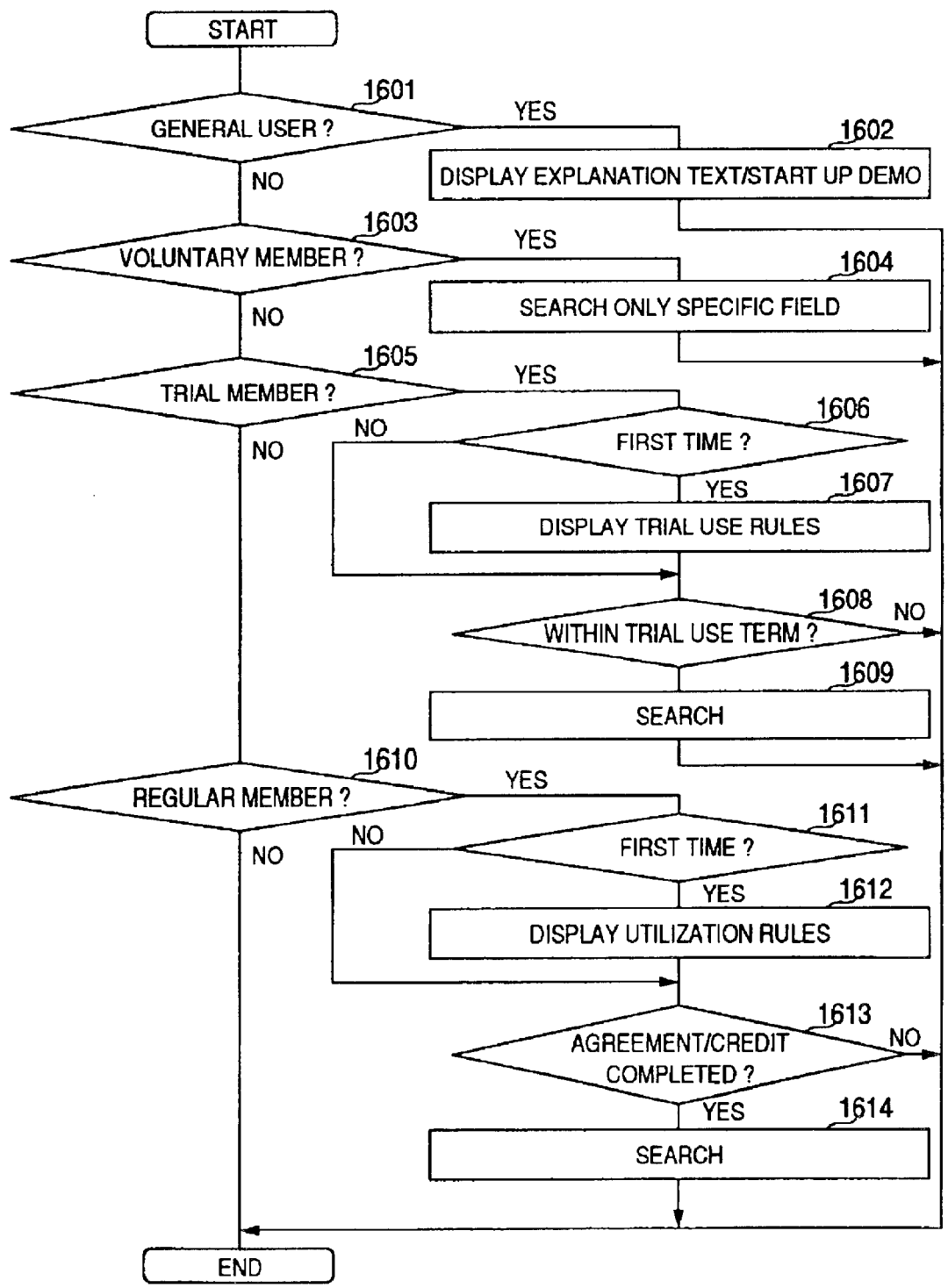
FIG. 16 is a flow chart showing processing procedures of a database searching service of an embodiment of the present invention.

FIG. 16 is a flow chart showing processing procedures of the database search service of this embodiment. In step 1601, the contents of provision determination processing portion 212 of the contents of provision controlling apparatus 100 checks the contents of the above-mentioned set utilization qualification variables and, if the contents of the utilization qualification valiables indicates a general user, proceeds to step 1602.

In step 1602, the contents providing apparatus 110 is instructed to display the explanation of the database search service that is permitted to be presented to general users and to start-up a demo program of the database search service. Upon receiving the instruction, the information service provision processing portion 310 of the contents providing apparatus 110 displays the explanation for general users concerning the database search service and starts up the demo program.

In step 1603, the contents of provision determination processing portion 212 of the contents of provision controlling apparatus 100 checks the contents of the above-mentioned set utilization qualification variable and, if the utilization qualification variable indicates a voluntary member, proceeds to step 1604.

In step 1604, the contents of provision determination processing portion 212 of the contents of provision controlling apparatus 100 instructs the contents providing apparatus 110 to utilize the database search service concerning a specific field permitted to be utilized by a voluntary member. Upon receiving the instruction, the information service provision processing portion 310 of the contents providing apparatus 110 receives a search instruction from the service requesting apparatus 120 and performs search processing of a specific field in the database search service. Here, when the database is searched, period of utilization or the function may be limited, or both the period of utilization and the function may be limited.

In step 1605, the contents of provision determination processing portion 212 of the contents of provision controlling apparatus 100 checks the contents of the above-mentioned set utilization qualification variable and, if the contents of the utilization qualification variable indicates a trial member, proceeds to step 1606.

In step 1606, the contents of provision determination processing portion 212 of the contents of provision controlling apparatus 100 checks if this trial use is the first time and, if it is the first time, displays the trial use rules and prompts a perusal in step 1607. In step 1608, the contents of provision determination processing portion 212 of the contents of provision controlling apparatus 100 checks if it is within the trial use period and, if it is within the trial use period, proceeds to step 1609 and instructs the contents providing apparatus 110 to utilize the database search service. Upon receiving the instruction, the information service provision processing portion 310 of the contents providing apparatus 110 receives a search instruction from the information providing service apparatus 120 and performs the search processing in the database search service. Here, the function may be limited instead of the trial use period, or both the trial use period and the function may be limited.

In step 1610, the contents of provision determination processing portion 212 of the contents of provision controlling apparatus 100 checks the contents of the above-mentioned set utilization qualification variable and, if the contents of the utilization qualification variable indicates a regular member, proceeds to step 1611.

In step 1611, the contents of provision determination processing portion 212 of the contents of provision controlling apparatus 100 checks if this formal utilization is the first time and, if it is the first time, displays the utilization rules in step 1612 and prompts a perusal. In step 1613, the contents of provision determination processing portion 212 of the contents of provision controlling apparatus 100 confirms if an agreement and a credit are concluded and, if an agreement and a credit are concluded, proceeds to step 1614 and instructs the contents providing apparatus 110 to utilize the database search service permitted to be utilized by a regular member. Upon receiving the instruction, the information service provision processing portion 310 of the contents providing apparatus 110 performs the search processing in the database search service. Further, the confirmation of conclusion of an agreement and a credit in step 1613 may be substituted by the fact that the formal utilization qualification is set in the utilization information table, and the confirmation of conclusion of an agreement and a credit in step 1613 may be omitted.

Figure 17:
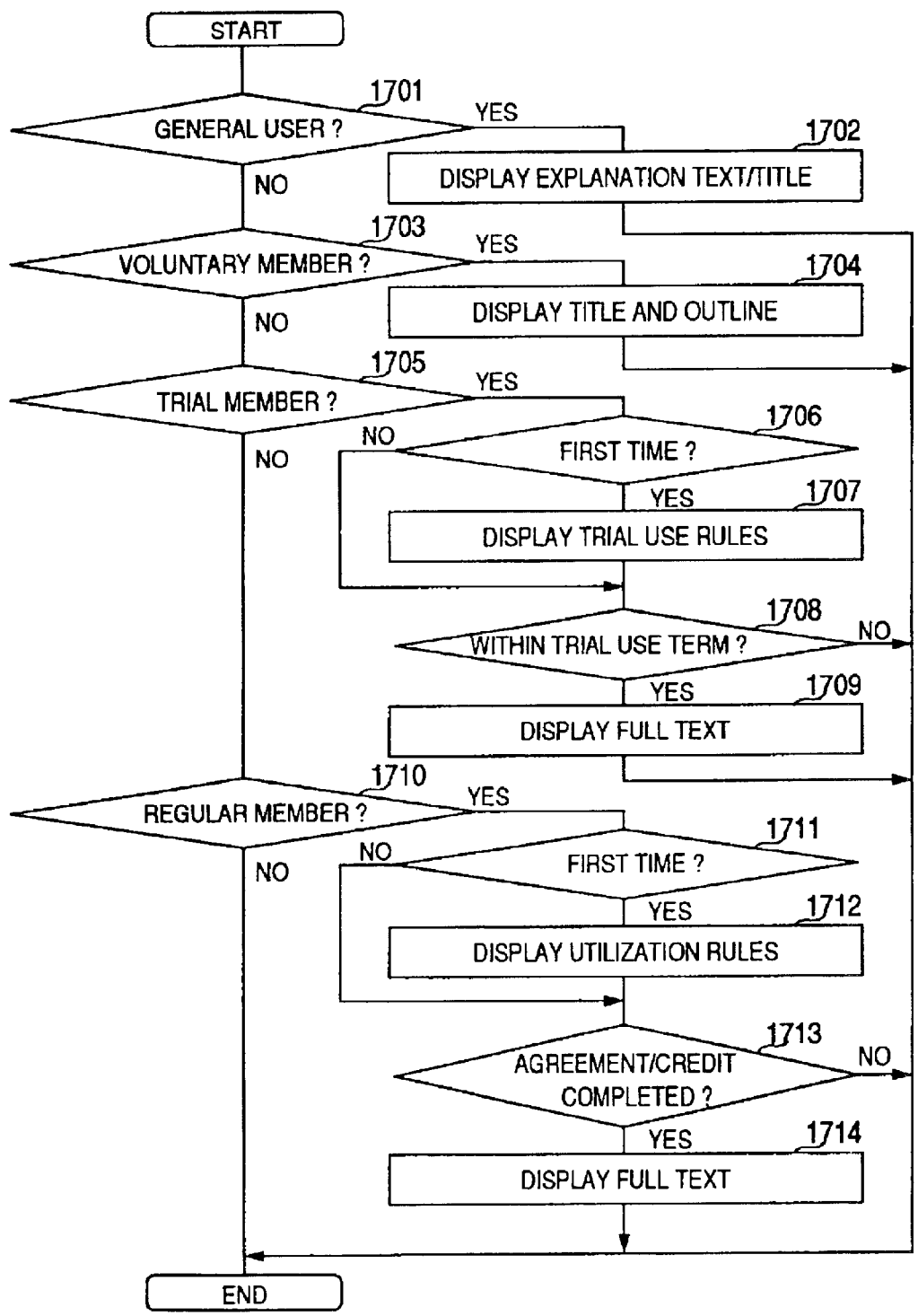
FIG. 17 is a flow chart showing processing procedures of technical information subscription and inspecting of an embodiment of the present invention.

FIG. 17 is a flow chart showing processing procedures for the technical information subscription and inspecting of this embodiment. In step 1701, the contents of provision determination processing portion 212 of the contents of provision controlling apparatus 100 checks the contents of the above-mentioned set utilization qualification variable and, if the contents of the utilization qualification variable indicates a general user, proceeds to step 1702.

In step 1702, the contents of provision determination processing portion 212 of the contents of provision controlling apparatus 100 instructs the display of the explanation of the technical information subscription and inspecting permitted to be presented to a general user or the title of the technical information to the contents providing apparatus 110. Upon receiving the instruction, the information service provision processing portion 310 of the contents providing apparatus 110 displays the explanation for a general user concerning the technical information subscription and inspecting and the title of the technical information.

In step 1703, the contents of provision determination processing portion 212 of the contents of provision controlling apparatus 100 checks the contents of the above-mentioned set utilization qualification variable and, if the contents of the utilization qualification variable indicates a voluntary member, proceeds to step 1704.

In step 1704, the contents of provision determination processing portion 212 of the contents of provision controlling apparatus 100 instructs the display of the title and the outline of the technical information permitted to be subscribed for and inspected by a voluntary member to the contents providing apparatus 110. Upon receiving this instruction, the information service provision processing portion 310 of the contents providing apparatus 110 displays the title and the outline of the technical information.

In step 1705, the contents of provision determination processing portion 212 of the contents of provision controlling apparatus 100 checks the contents of the above-mentioned set utilization qualification variable and, if the contents of the utilization qualification variable indicates a trial use member, proceeds to step 1706.

In step 1706, the contents of provision determination processing portion 212 of the contents of provision controlling apparatus 100 checks if this trial use is the first time and, if it is the first time, displays the trial use rules and prompts a perusal in step 1707. In step 1708, the contents of provision determination processing portion 212 of the contents of provision controlling apparatus 100 checks if it is within the trial use period and, if it is within the trial use period, proceeds to step 1709 and instructs the contents providing apparatus 110 to display the full text of the technical information. The information service provision processing portion 310 of the contents providing apparatus 110, upon receiving the instruction, displays the full text of the technical information. Here, the contents of display may be limited instead of the trial use period, or both the trial use period and the contents of display may be limited.

In step 1710, the contents of provision determination processing portion 212 of the contents of provision controlling apparatus 100 checks the contents of the above-mentioned set utilization qualification variable and, if the contents of the utilization qualification variable indicates a regular member, proceeds to step 1711.

In step 1711, the contents of provision determination processing portion 212 of the contents of provision controlling apparatus 100 checks if this formal utilization is the first time and, if it is the first time, displays the utilization rules and prompts a perusal in step 1712. In step 1713, the contents of provision determination processing portion 212 of the contents of provision controlling apparatus 100 confirms if an agreement and a credit are concluded and, if an agreement and a credit are concluded, proceeds to step 1714 and instructs the contents providing apparatus 110 to display the full text of the technical information. The information service provision processing portion 310 of the contents providing apparatus 110, upon receiving the instruction, displays the full text of the technical information. Further, the confirmation of conclusion of an agreement and a credit in step 1713 may be substituted by the fact that the formal utilization qualification is set in the utilization information table, and the confirmation of conclusion of an agreement and a credit in step 1713 may be omitted.

Then, the detailed processing contents of the application service performed between the contents providing apparatus 110 and the information providing service apparatus 120 will now be described in this embodiment.

Figure 18:
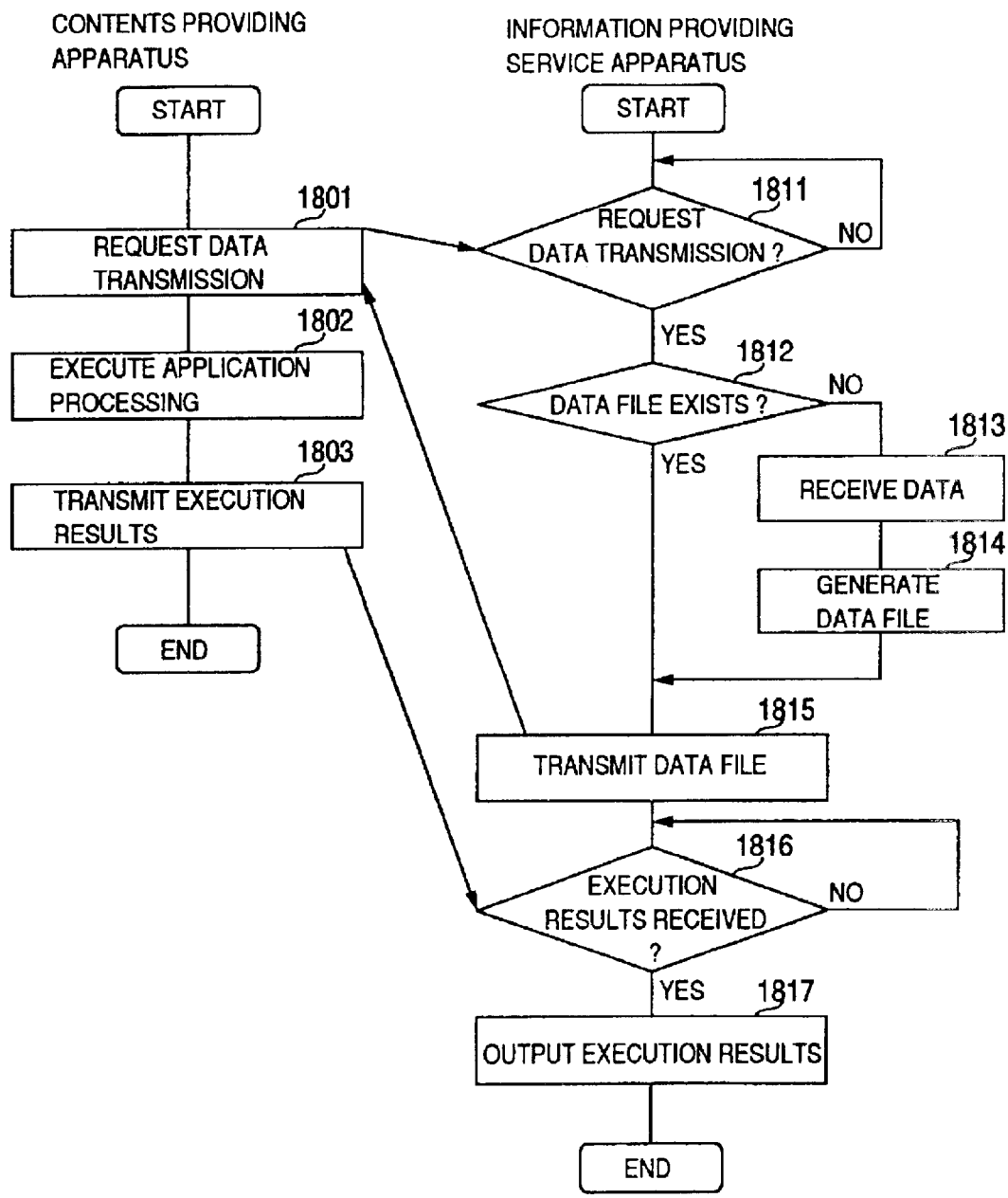
FIG. 18 is a flow chart showing processing procedures of an application service execution processing of an embodiment of the present invention.

FIG. 18 is a flow chart showing processing procedures of the execution processing of the application service of this embodiment. As shown in FIG. 13, when the contents providing apparatus 110 is instructed to start up the application service, upon receiving this instruction, the information service provision processing portion 310 of the contents providing apparatus 110 starts the processing of step 1801 and requests the information providing service apparatus 120 to transmit the data necessary for the execution of the application service.

In step 1811, the data generation processing portion 410 of the information providing service apparatus 120 checks whether the information providing service apparatus 120 has received the data transmission request from the contents providing apparatus and, if it has received the data transmission request, proceeds to step 1812.

In step 1812, the data generation processing portion 410 checks if the data file storing the data necessary for the processing of the application service is designated and, if it is not designated, proceeds to step 1813.

In step 1813, the data generation processing portion 410 displays the screen supporting the input of the data necessary for the processing of the application service, prompts the data input form a customer and receives the input data from a customer. When the input of data received from a customer is finished, the data generation processing portion 410 proceeds to step 1814 and generates a data file storing data adapting to the input interface of the application program that provides the application service.

In step 1815, the data transmission processing portion 411 transmits the above-mentioned generated data file to the contents providing apparatus 110 that provides the application service designated by a customer.

In step 1801, the information service provision processing portion 310 of the contents providing apparatus 110, upon receiving the data file from the information providing service apparatus 120, transfers the received data file to the information service execution processing portion 311.

In step 1802, the information service execution processing portion 311 executes a program including design know-how that cannot be published in detail or a program requiring a specific environment of the operation using the data file transmitted from the information providing service apparatus 120 in the requesting side that requests the provision of the application service, and executes the application processing for providing the application service.

In step 1803, the execution result transmission processing portion 312 transmits the execution results obtained by the above-mentioned execution to the information providing service apparatus 120 in the requesting side of the application service.

In step 1816, the execution result output processing portion 412 of the information providing service apparatus 120 checks if the execution results have been transmitted from the contents providing apparatus 110 and, if the execution results have been transmitted, receives and outputs them as the contents of the provision of the application service.

The generation and the transmission of the data file in steps 1814 and 1915 may be left to, for example, the standard function of the Internet browser.

The application service in this embodiment conforms to this embodiment as far as it serves the convenience of a customer even if it is not a program including know-how or the like with high confidentiality or a program requiring a special environment for operation.

Further, in this embodiment, the contents 307 of the contents providing apparatus 110 is regarded as including not only the know-how accumulated in the company but also know-how of other companies, and may be for an agency for providing know-how that keeps know-how from other companies and sells it to outside.

In addition, if know-how is provided from many departments in the company or many other companies, since contents of various kinds of inquires or applications are manifold, it is necessary to successfully allocate the received inquiries to a plurality of department coping with them. If the service to be provided is a technology or know-how, since there are a lot of technical terms, there is a possibility that it is hard for the general clerk to understand what an inquiry relates to. For such a problem, a solution by means of searching keyword included in a mail text consisting of usual language is described, for example, in JP-A-2000-020541.

As an alternative solution, a method to set standards keywords relating to the contents of inquires in a fixed form at the time of sending a mail can be considered. As a method to realize this, a method can be considered in which inquiry requesting functions are set depending on necessity in a page common to each user, an introduction page of various kinds of contents menus, a page of various kinds of onerous menus or the like, an inquiry page is displayed based on this request, and when a user presses the transmission button after inputting inquiry contents on an inquiry page, inquiry contents are converted to a mail together with the identification information of the page that is the basis of the inquiry or keywords relating to the page, the inquiry is turned into a form that can specify what the inquiry relates to and sent to the inquiry counter.

Figure 19:
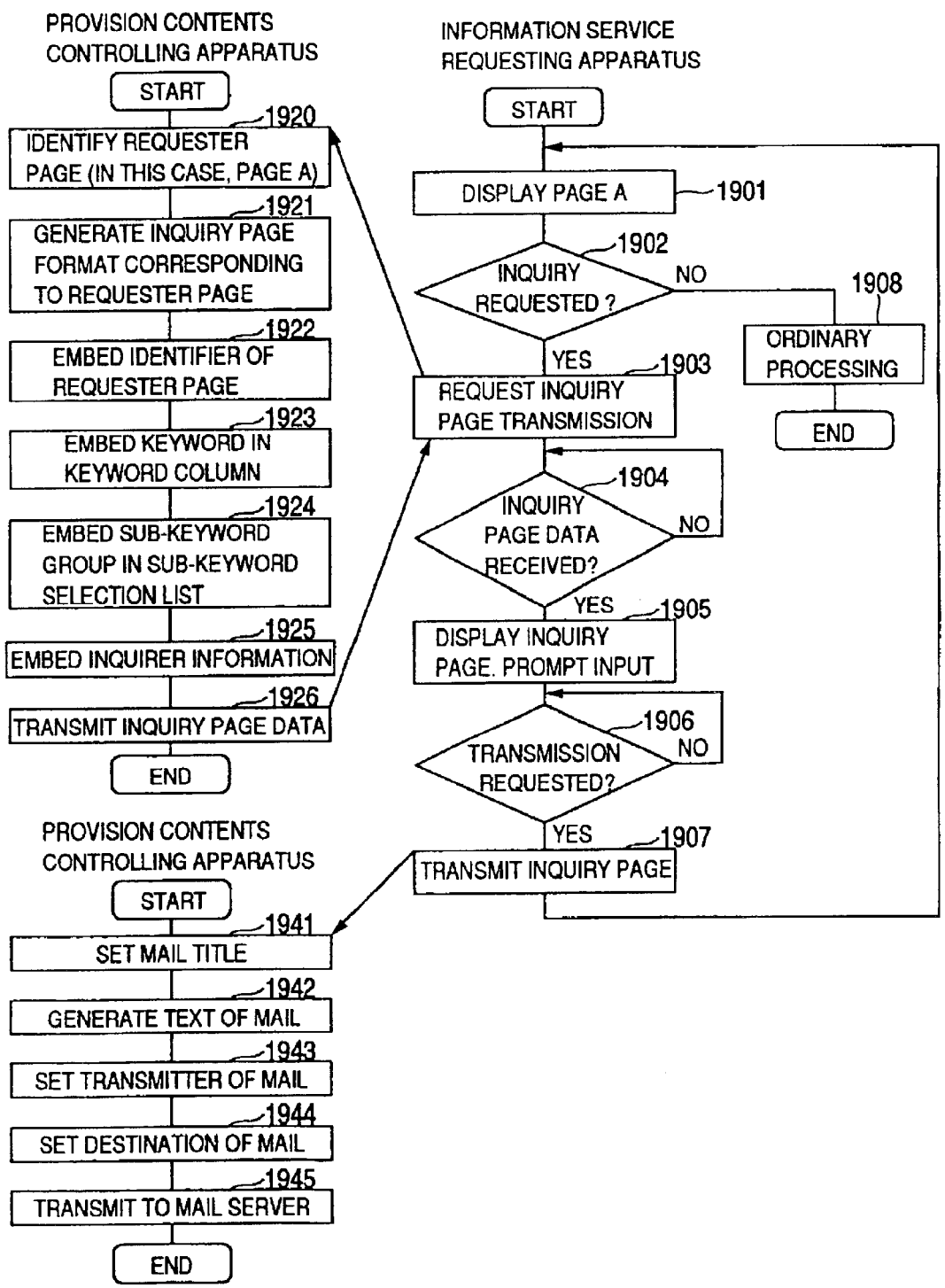
FIG. 19 is a flow chart showing procedures of an inquiry transmitting procedures of an embodiment of the present invention.

FIG. 19 is a flow chart showing processing procedures for sending an inquiry mail from an information service user in this embodiment. In FIG. 19, step 1901 is the step for displaying an arbitrary information service page that has an inquiry requesting function. This page is referred to the page A as an example here. When a user makes an inquiry request while the page A is displayed, the processing proceeds to step 1903 via the determination in step 1902. The page displayed at the time when an information service user makes an inquiry request is hereinafter referred to as the requester page. In this example, the page A is the requester page.

In step 1903, a transmission request for an inquiry page is made to the contents of provision controlling devise 100. Here, in a transmission requesting electronic sentence, an identifier of the requester page is embedded.

In step 1920, a page that is the requester of an inquiry is identified. For this purpose, a requester page identifier embedded as described above from the information providing service apparatus 120 is utilized.

FIG. 20 illustrates an example of the inquiry page and an example of the title and the text of an inquiry mail produced from the inquiry page. In step 1921 of FIG. 19, a format of an inquiry page corresponding to a requester page is generated. This format consists of a keyword column, a sub-keyword selection list and sub-keyword column, a requester page name column, an inquiry classification selection list and inquiry classification column, a variety of information columns of the information service user, a title designated by an information service user column and an inquiry contents column. This format may be prepared in advance for each pattern by classifying a requester page by pattern and stored in the information contents controlling apparatus together with a correspondence table of a requester page.

In step 1922, an identifier of a requester page is embedded in the format. Here, the name of a requester page may be embedded.

In step 1923, a keyword relating to a requester page is embedded in the format. This keyword may be defined in advance by collecting, for example, names of various kinds of services provided by the information service provider or item names relating to items common to various services.

In step 1924, a sub-keyword group is embedded in the sub-keyword selection list of the format so that an information service user can select a sub-keyword. This sub-keyword group may be defined, for example, by collecting relating item groups with respect to the keyword.

In step 1925, information of an information service user is embedded in the inquiry page format in advance in order to save an information service user's input trouble. Information to be embedded are, for example, a member mail address, a name or the like when an information service user is a member. This step 1925 may be omitted if unnecessary.

In step 1926, the inquiry page prepared as above is transmitted to the information providing service apparatus 120.

The information providing service apparatus 120, upon receiving the inquiry page, displays the inquiry page on the screen and prompts an information service user's input. An information service user selects a sub-keyword from the sub-keyword list, specifies an inquiry classification, writes inquiry contents and makes a transmission request after confirming the contents.

In step 1907, the contents of the inquiry page including the input contents of an information service user is transmitted to the contents of provision controlling apparatus.

In step 1941, the title of a mail is set. The title is, for example, in FIG. 20, the one consisting of a keyword and an inquiry classification and an information service user designated title connected by hyphens.

In step 1942, a text of the mail is produced. The text is, for example, in FIG. 20, the one including the date when the inquiry was made, a sub-keyword, various kinds of information of an information service user, a requester page name and the inquiry contents in a fixed form.

In step 1943, a mail address of the mail transmitter is set. This is the mail address of the information service user.

In step 1944, a destination of the mail is set. Here, the mail address of the common inquiry counter is set. Further, if there are a plurality of common inquiry counters, a common inquiry counter may be automatically determined and set based on a keyword and an inquiry classification. In addition, if a department in charge of preparing a reply to an inquiry can be identified at this time, both the common inquiry counter and the department in charge of preparing a reply may be destinations.

In step 1945, the mail file prepared as above is transmitted to the mail server. Further, if the contents of provision controlling apparatus 100 has the mail forwarding function, it may forward a mail directly.

In the mail transmitting method described above, the setting of a screen identifier in step 1903 and step 1922 may be omitted in an example in which the session management is implemented and it can always be determined which is the requester page in the information service providing apparatus 120.

In addition, a page in which processing of step 1922 and step 1923 is applied to the format generated in step 1921 may be stored in the contents of provision controlling apparatus. Further, when the page A is displayed in step 1901, a method of simultaneously displaying an inquiry page at the lower part of the page A may be used together.

Naturally, not all of the items are necessary in an example of the inquiry page of FIG. 20. For example, a sub-keyword list may be omitted.

A counter receiving an inquiry mail may analyze the identification information of a requester page, a mail title and a fixed form portion of a text, and automatically return a reply to the one to which a reply can automatically be sent or the one that includes a similar keyword as in an inquiry in the past. For other mails, the counter may determine a department in charge of preparing a reply by analyzing the identification information of a requester page, a mail title and contents of a text and transfer the inquiry mail to the department automatically or manually. Further, transmission of the inquiry may be made in the form of a file or the like other than a mail.

Generally, a user of an information providing service may be an individual or a corporation. The present invention can by applied to either of them. In this embodiment, as an example, the case in which an information service targets an individual and the payment of an information service utilization charge and an information service utilization agreement is made in the name of a corporation is described. In such a case, it is desirable that an information service provider manages information of an individual information service user and an individual information service user can conduct an application for utilization of an information service. On the other hand, in an information service utilization agreement to be concluded with a corporation, a consent of a corporation to which a user belongs to or a representative of an organization in the corporation is required. An application form for this purpose must be prepared by an information service user in general.

FIG. 22 is an example of an information service utilization agreement of this embodiment. In this agreement, columns are provide for information and a seal (including electronic seal) of an individual information service user, and for information of a corporation to which the information service user belongs to and a seal of a corporation or a representative of an organization in the corporation.

The agreement is made to be able to be downloaded from an information providing system by an information service user at the time when the information service user applies for utilization of the information service on the information service providing system and upon automatically filling out items already known to the information service provider side, for example, member information of the information service user. Further, the agreement may be mailed or sent by an electronic mail. In accordance with the above-mentioned method, in an information service such as the one targeting the personal utilization of an individual belonging to a corporation, an information service provider can obtain information of an individual user and, on the other hand, by concluding an agreement with a corporation, a credit guarantee of the individual user is simplified. In addition, the agreement is made to be able be used also as an information service utilization approval application form in a corporation to which an information service user belongs. This makes it possible to ease the burden at the time when an information service user applies for an information service utilization. As described above, in accordance with an information service providing system of this embodiment, since an information service corresponding to a customer's utilization qualification is provided, an information service with high confidentiality can be provided efficiently.

In accordance with the present invention, since an information service corresponding to a customer's utilization qualification is provided, an information service with high confidentiality can be provided efficiently.

What is claimed is:

1. An information service providing method for providing an information service, comprising the steps of:
   receiving a customer's request for said information service to be provided with;
   deciding the customer's utilization qualification with respect to the contents of said information service;
   determining the contents that is available to the customer according to the customer's utilization qualification among said contents of said information service that the customer requests to be provided with;
   displaying information as a list, the information showing correspondence relationships between services that the customer can utilize and a plurality of utilization qualifications with respect to the services;
   receiving an instruction from the customer selecting a utilization qualification with respect to the services being displayed;
   determining to impose a limitation regarding a period of utilization of old-version software if the utilization qualification contained in the instruction received is a voluntary member;
   determining to impose a limitation regarding a period of utilization of latest-version software if the utilization qualification contained in the instruction received is a regular member; and
   providing the customer with a service of a content thus determined.

2. An information service providing method for providing an information service, comprising the steps of:
   receiving a customer's data at a requesting side to generate data necessary for the provision of said information service;
   transmitting said generated data to a providing side that provides said information service;
   executing procedures for providing said information service using the data transmitted from the requesting side that requires the provision of said information service;
   transmitting execution results obtained by said execution to the requesting side of said information service;
   receiving the execution results transmitted from the providing side of said information service;
   displaying information from the execution results as a list, the information showing correspondence relationships between services that the customer can utilize and a plurality of utilization qualifications with respect to the services;
   receiving an instruction from the customer selecting a utilization qualification with respect to the services being displayed;
   determining to impose a limitation regarding a period of utilization of old-version software if the utilization qualification contained in the instruction received is a voluntary member;
   determining to impose a limitation regarding a period of utilization of latest-version software if the utilization qualification contained in the instruction received is a regular member; and
   providing the customer with a service of a content thus determined.

3. An information service providing system for providing an information service, comprising:
   a receipt processing portion for receiving a customer's request for said information service to be provided with;
   a utilization qualification setting processing portion for deciding the customer's utilization qualification with respect to the contents of said information service;
   a display, the display displaying information as a list, the information showing correspondence relationships between services that the customer can utilize and a plurality of utilization qualifications with respect to the services, the receipt processing portion receiving an instruction from the customer selecting a utilization qualification with respect to the services being displayed;
   a contents of provision determination processing portion for determining the contents that is available to the customer according to the customer's utilization qualification among said contents of said information service that the customer requests to be provided with, the contents of provision determination processing portion determining to impose a limitation regarding a period of utilization of old-version software if the utilization qualification contained in the instruction received is a voluntary member, and determining to impose a limitation regarding a period of utilization of latest-version software if the utilization qualification contained in the instruction received is a regular member; and an information service provision processing portion for providing the customer with said determined contents of said information service.

4. An information service providing system for providing an information service, comprising:
   a requesting side apparatus provided with a data generation processing portion for receiving a customer's data to generate data necessary for the provision of information service, data transmission processing portion for transmitting said generated data to a providing side that provides said information service and an execution results output processing portion for receiving and outputting the execution results transmitted from the providing side of said information and;
   a providing side apparatus provided with an information service execution processing portion for executing procedures for providing said information service using the generated data transmitted from the requesting side apparatus that requires the provision of said information service and an execution result transmission processing portion for transmitting execution results obtained by said execution to the requesting side apparatus of said information service,
   wherein the procedures include displaying information as a list, the information showing correspondence relationships between services that the customer can utilize and a plurality of utilization qualifications with respect to the services; receiving an instruction from the customer selecting a utilization qualification with respect to the services being displayed; determining to impose a limitation regarding a period of utilization of old-version software if the utilization qualification contained in the instruction received is a voluntary member; determining to impose a limitation regarding a period of utilization of latest-version software if the utilization qualification contained in the instruction received is a regular member; and providing the customer with a service of a content thus determined.

5. A computer readable recording medium recording a program for causing a computer to function as an information service providing system for providing an information service, wherein the program when executed causes a computer to perform:
   receiving a customer's request for said information service to be provided with;
   deciding the customer's utilization qualification with respect to the contents of said information service;
   determining the contents that is available to the customer according to the customer's utilization qualification among said contents of said information service that the customer requests to be provided with;
   providing the customer with said determined contents of said information service;
   displaying information as a list, the information showing correspondence relationships between services that the customer can utilize and a plurality of utilization qualifications with respect to the services;
   receiving an instruction from the customer selecting a utilization qualification with respect to the services being displayed;
   determining to impose a limitation regarding a period of utilization of old-version software if the utilization qualification contained in the instruction received is a voluntary member;
   determining to impose a limitation regarding a period of utilization of latest-version software if the utilization qualification contained in the instruction received is a regular member; and
   providing the customer with a service of a content thus determined.

6. An information service providing method for providing an information service, comprising:
   displaying information as a list, the information showing correspondence relationships between services that an information service user can utilize and a plurality of utilization qualifications with respect to the services;
   receiving an instruction from the information service user selecting a utilization qualification with respect to the services being displayed;
   determining to impose a limitation regarding a period of utilization of old-version software if the utilization qualification contained in the instruction received is a voluntary member;
   determining to impose a limitation regarding a period of utilization of latest-version software if the utilization qualification contained in the instruction received is a regular member; and
   providing the information service user with a service of a content thus determined,
   wherein the information service user conducts an information service utilization application on an information service utilization application page in an information service providing system, the information service user and an information service provider conclude an agreement concerning said information service utilization after said utilization application, and the information service user is given a utilization qualification of said information service after the formal agreement is completed.

7. The information service providing method according to claim 6, wherein, at the time when the information service user conducts said information service utilization application, said utilization qualification is preliminary given and, if said formal agreement is not concluded by a predetermined date, said given preliminary utilization qualification is canceled.

8. The information service providing method according to claim 6, wherein, if the information service user who conducted said utilization application has a record of concluding a formal agreement with the information service provider concerning the utilization of any information service provided by the information service provider, the utilization qualification of this time of said information service is formally given at the time of conducting said information service utilization application of this time, and said formal agreement of this time is not necessary concerning said information service of this time.

9. The information service providing method according to claim 6, wherein an individual information service user presents user information such as the name and puts a seal on said formal agreement, and a corporation to which the information service user belongs or a representative of an organization in the corporation presents information concerning the corporation or the organization in the corporation such as the name of the representative and puts a seal on said formal agreement.

10. The information service providing method according to claim 7, wherein an individual information service user presents user information such as the name and puts a seal on said formal agreement, and a corporation to which the information service user belongs or a representative of an organization in the corporation presents information concerning the corporation or the organization in the corporation such as the name of the representative and puts a seal on said formal agreement.

11. The information service providing method according to claim 8, wherein an individual information service user presents user information such as the name and puts a seal on said formal agreement, and a corporation to which the information service user belongs or a representative of an organization in the corporation presents information concerning the corporation or the organization in the corporation such as the name of the representative and puts a seal on said formal agreement.

12. An information service providing method for providing an information service, comprising the steps of:

displaying an information service page to which an inquiry requesting function added to an information service user;

conducting an inquiry request from said displayed information service page by said information service user;

selecting an inquiry page conforming to said inquiry request out of an inquiry page group prepared in advance;

displaying said selected inquiry page on a screen;

prompting the information service user to input inquiry contents to said displayed inquiry page;

generating an inquiry mail from said contents inputted to said displayed inquiry page;

displaying information as a list, the information showing correspondence relationships between services that the information service user can utilize and a plurality of utilization qualifications with respect to the services;

receiving an instruction from the information service user selecting a utilization qualification with respect to the services being displayed;

determining to impose a limitation regarding a period of utilization of old-version software if the utilization qualification contained in the instruction received is a voluntary member;

determining to impose a limitation regarding a period of utilization of latest-version software if the utilization qualification contained in the instruction received is a regular member; and providing the information service user with a service of a content thus determined.

13. The information service providing method according to claim 12, wherein said method for selecting an inquiry page conforming to said inquiry request is a method for adopting an inquiry page that is made to be related to said information service page in advance.

14. The information service providing method according to claim 12, further comprising a step of including necessary items relating to said information service page in the title, the text or the attached file of said inquiry mail.

15. The information service providing method according to claim 13, further comprising a step of including necessary items relating to said information service page in the title, the text or the attached file of said inquiry mail.

\* \* \* \* \*